United States Patent
Everitt et al.

(10) Patent No.: US 12,551,149 B2
(45) Date of Patent: Feb. 17, 2026

(54) SAMPLE-TO-ANSWER DIAGNOSTIC SYSTEM FOR THE DETECTION OF CIRCULATING HISTONES IN WHOLE BLOOD

(71) Applicant: University of Maryland, College Park, College Park, MD (US)

(72) Inventors: Micaela Everitt, Washington, DC (US); David Boegner, White Hall, MD (US); Ian M. White, Washington, DC (US)

(73) Assignee: University of Maryland, College Park, College Park, MD (US)

( * ) Notice: Subject to any disclaimer, the term of this patent is extended or adjusted under 35 U.S.C. 154(b) by 792 days.

(21) Appl. No.: 17/811,491

(22) Filed: Jul. 8, 2022

(65) Prior Publication Data

US 2023/0063411 A1    Mar. 2, 2023

Related U.S. Application Data

(60) Provisional application No. 63/219,755, filed on Jul. 8, 2021.

(51) Int. Cl.
*A61B 5/15* (2006.01)
*B01L 7/00* (2006.01)
(Continued)

(52) U.S. Cl.
CPC .......... *A61B 5/150022* (2013.01); *B01L 7/52* (2013.01); *G01N 21/6428* (2013.01);
(Continued)

(58) Field of Classification Search
CPC . A61B 5/150022; B01L 7/52; B01L 2200/16; G01N 21/6428;
(Continued)

(56) References Cited

U.S. PATENT DOCUMENTS

| | | |
|---|---|---|
| 10,323,274 B2 | 6/2019 | Freudenthal et al. |
| 2013/0052650 A1 | 2/2013 | Kavanagh et al. |
| 2014/0154792 A1 | 6/2014 | Moynihan et al. |

OTHER PUBLICATIONS

Abrams et al., "Circulating Histones Are Mediators of Trauma-associated Lung Injury," Am J Respir Crit Care Med, 2013, vol. 187, Iss. 2, pp. 160-169.

(Continued)

*Primary Examiner* — Jennifer Wecker
*Assistant Examiner* — Steven Ray Castaneda
(74) *Attorney, Agent, or Firm* — McKee, Voorhees & Sease, PLC

(57) ABSTRACT

Disclosed are liquid and solid assay compositions and portable sample reader devices for use in a sample-to-answer diagnostic system for the detection of one or more analytes, preferably the detection of circulating histones in whole blood. Further provided are methods of making and using the assay compositions and portable sample reader, including the collection of a raw sample, testing the sample using the assay compositions, and analyzing the sample via the portable sample reader. More particularly, assay compositions comprising a sacrificial partition, target molecule, detectable label, and sacrificial partition are used in combination with a sample reader comprising an optical system and a housing unit as part of a sample-to-answer diagnostic system for quantifying circulating histones in whole blood as a mechanism of predicting the risk of multiple organ failure.

11 Claims, 20 Drawing Sheets

(51) Int. Cl.
  *G01N 21/64* (2006.01)
  *C09B 15/00* (2006.01)
(52) U.S. Cl.
  CPC ........... *B01L 2200/16* (2013.01); *C09B 15/00* (2013.01); *G01N 2021/6419* (2013.01); *G01N 2021/6441* (2013.01)
(58) Field of Classification Search
  CPC ... G01N 2021/6419; G01N 2021/6441; G01N 33/6875; C09B 15/00
  See application file for complete search history.

(56) References Cited

OTHER PUBLICATIONS

Aneja et al., "Inflammatory cytokines associated with outcomes in orthopedic trauma patients independent of New Injury Severity score: A pilot prospective cohort study," Journal of Orthopaedic Research, 2021, vol. 40, Iss. 7, 8 pages.
Boegner et al., "Thermally Responsive Alkane Partitions for Assay Automation," ACS Appl Mater Interfaces, 2022, vol. 14, pp. 8865-8875.
Chen et al., "Release and activity of histone in diseases," Cell Death and Disease, 2014, vol. 5, 9 pages.
Cheng et al., "Circulating histones are major mediators of multiple organ dysfunction syndrome in acute critical illnesses," Critical Care Medicine, 2019, vol. 47, 27 pages.
Dao et al., "The Organ Trail: A Review of Biomarkers of Organ Failure," Frontiers in Oncology, Nov. 2020, vol. 10, No. 579219, 10 pages.
Ekaney et al., "Impact of plasma histones in human sepsis and their contribution to cellular injury and inflammation," Critical Care, 2014, vol. 18, No. 543, 9 pages.
Everitt et al., "Sample-to-Answer Diagnostic System for the Detection of Circulating Histones in Whole Blood," ACS Sensors, 2021, vol. 6, No. 8, pp. 3006-3012.
Garcia-Gimenez et al., "A new mass spectrometry-based method for the quantification of histones in plasma from septic shock patients," Scientific Reports, 2017, vol. 7, No. 10643, 10 pages.
Goertz et al., "Multistage Chemical Heating for Instrument-Free Biosensing," ACS Appl Mater Interfaces, 2018, vol. 10, pp. 33043-33048.
Goertz et al., "Phase-Change Partitions for Thermal Automation of Multistep Reactions," Anal Chem, 2018. vol. 90, pp. 3708-3713.
Hess et al., "Methods and recommendations for evaluating and reporting a new diagnostic test," Author Manuscript, Eur J Clin Microbiol Infect Dis, Sep. 2012, vol. 31, No. 9, pp. 2111-2116.
Karki et al., "Extracellular histones in lung dysfunction: a new biomarker and therapeutic target?," Pulmonary Circulation, 2020, vol. 10, No. 4, 8 pages.
Kawai et al., "Circulating Extracellular Histones Are Clinically Relevant Mediators of Multiple Organ Injury," The American Journal of Pathology, 2016, vol. 186, No. 4, pp. 829-843.
Li et al., "Circulating Histones in Sepsis: Potential Outcome Predictors and Therapeutic Targets," Frontiers in Immunology, vol. 12, No. 650184, Mar. 2021, 13 pages.
Liu et al., "Accuracy of circulating histones in predicting persistent organ failure and mortality in patients with acute pancreatitis," Br J Surg, 2017, vol. 104, pp. 1215-1225.
Lu et al., "Label-free detection of histone based on cationic conjugated polymer-mediated fluorescence resonance energy transfer," Talanta, 2018, vol. 180, pp. 150-155.
Lv et al., "Extracellular histones are clinically relevant mediators in the pathogenesis of acute respiratory distress syndrome," Respiratory Research, 2017, vol. 18, No. 165, 9 pages.
Maiti et al., "Label-free fluorimetric detection of histone using quaternized carbon dot-DNA nanobiohybrid," Chem Commun, 2013, vol. 49, pp. 8851-8853.
Neu et al., "Effects of Dextran Molecular Weight on Red Blood Cell Aggregation," Biophysical Journal, Sep. 2008, vol. 95, pp. 3059-3065.
Pribush et al., "The mechanism of the dextran-induced red blood cell aggregation," Eur Biophys J, 2007, vol. 36, pp. 85-94.
Shapiro et al., "A prospective, multicenter derivation of a biomarker panel to assess risk of organ dysfunction, shock, and death in emergency department patients with suspected sepsis," Crit Care Med, 2009, vol. 37, No. 1, pp. 96-104.
Silk et al., "The role of extracellular histone in organ injury," Cell Death and Disease, 2017, vol. 8, No. 5, 11 pages.
Thompson et al., "Late immune consequences of combat trauma: a review of trauma-related immune dysfunction and potential therapies," Military Medical Research, 2019, vol. 6, No. 11, 13 pages.
Vulliamy et al., "Histone H4 induces platelet ballooning and microparticle release during trauma hemorrhage," PNAS, Aug. 2019, vol. 116, No. 35, pp. 17444-17449.
Wang et al., "Label-Free Detection of DNA-Binding Proteins Based on Microfluidic Solid-State Molecular Beacon Sensor," Anal Chem, 2011, vol. 83, pp. 3528-3532.
Wen et al., "Circulating histones are major mediators of systemic inflammation and cellular injury in patients with acute liver failure," Cell Death and Disease, 2016, vol. 7, 10 pages.

SAMPLE-TO-ANSWER DIAGNOSTIC SYSTEM FOR THE DETECTION OF CIRCULATING HISTONES IN WHOLE BLOOD

CROSS-REFERENCE TO RELATED APPLICATIONS

This application claims priority under 35 U.S.C. § 119 to provisional application Ser. No. 63/219,755 filed Jul. 8, 2021, herein incorporated by reference in its entirety.

TECHNICAL FIELD

The subject matter of the present disclosure generally relates to the rapid diagnosis of internal trauma. In some example embodiments, a point-of-care diagnostic system utilizes interactions between histones and DNA to detect circulating histones in the blood for diagnosing organ failure due to severe trauma.

TECHNICAL BACKGROUND

Severe internal trauma results in millions of hospitalizations each year, including thousands of deaths caused by subsequent multiple organ failure. The majority of these deaths occur within the first 24 hours, and thus, a rapid diagnosis of internal trauma severity is necessary for immediate treatment. For early organ damage identification, diagnosis in point-of-care settings is crucial for rapid triage and treatment. One indicator of organ damage includes histones, which may serve as a biomarker for severe organ damage and risk of multiple organ failure.

Internal trauma accounts for an estimated 59% of all deaths in the United States among individuals under 45. Millions are hospitalized each year for traumatic injuries, resulting in hundreds of thousands of deaths. Although it is difficult to diagnose the severity of internal trauma, it is crucial to determine the degree of organ damage caused by traumatic injury, as severe organ damage may lead to multiple organ failure and subsequent death. The majority of deaths following a severe traumatic injury due to multiple organ failure occur within the first 24 hours, and thus the rapid diagnosis of internal trauma is necessary.

For early identification of severe organ damage, diagnosis needs to occur in near-patient settings (e.g., triage setting or battlefield) to quickly identify severe traumatic injuries, and thus a point-of-care diagnostic solution is necessary. More specifically, because the diagnosis must occur outside of a sophisticated laboratory and by first responders instead of trained laboratory technicians, the diagnostic should be sample-to-answer and require minimal equipment, with no precise manual steps and no automation equipment or bulky readers.

For example, trauma-induced acute respiratory dysfunction syndrome (ARDS) is a deadly condition in which lung failure results from a traumatic injury to another part of the body. Traumatic injuries cause a massive amount of cell death, resulting in the release of high concentrations of histones into circulation, which can directly lead to ARDS, as histones damage the lungs. Specifically, histones have been shown to cause edema, hemorrhage, microvascular thrombosis, and neutrophil congestion. In addition, circulating histones exacerbate pro- and anti-inflammatory responses to trauma that also result in damage to the lungs and other organs. Once ARDS develops, it is particularly difficult to reverse; reported death rates from ARDS range from 50% to 80%. Reports have demonstrated that heparin and anti-histone therapies mitigate the lung damage and immune dysregulation induced by circulating histones; thus, if administered early enough, these therapies could enable life-saving treatments before a patient develops ARDS. However, there currently are no methods to accurately assess the risk of ARDS while at a stage where it is still treatable.

Molecular biomarkers for the diagnosis of internal trauma may be derived from the body's response. Internal traumatic injury leads to a cascading immune response, which begins with inflammation caused by increased levels of pro-inflammatory cytokines including interleukin-1p and interleukin-6 in response to internal injury; these cytokines have been proposed as potential biomarkers. However, protein biomarkers generally require an ELISA, which can take hours to perform and are confined to central laboratories because of the complex steps. Alternatively, shock, induced by internal injury, diminishes oxygen delivery, which results in tissue hypoxia, anaerobic metabolism, and consequently, lactate production. Thus, lactate can also be used as a biomarker for internal trauma. In a clinical setting, lactic acid is measured in a gold standard blood gas test in a hematology analyzer, which requires anaerobic arterial samples, uses large sample volumes, and is not user-friendly or affordable. Point-of-care electrochemical detection methods for lactic acids have successfully transitioned to sample-to-answer by directly collecting a blood drop onto a strip, which can be read by a handheld analyzer. Although this point-of-care method successfully differentiates between high and normal lactate levels, it struggles to detect slightly elevated levels, crucial for the early detection of traumatic injury. It is evident that new methods are necessary for the point-of-care diagnosis of internal trauma. Moreover, a more accurate approach may be to directly measure the result of the organ damage as opposed to the body's response to it.

Recent research demonstrates that damage to a single organ leads to multiple organ failure due to the release of histones into circulation following the trauma. Traumatic injuries cause massive cell death, resulting in the release of internal cell components, such as nucleosomes, which are degraded to circulating histone. One cause of organ damage stems from histone toxicity as extracellular histone levels rise. Once released into the extracellular space, circulating histones act as damage-associated molecular pattern (DAMP) proteins, which activate the immune system by interacting with Toll-like receptors (TLRs) to promote pro-inflammatory cytokine release to increase calcium uptake in immune and endothelial cells. This elevated intracellular calcium exacerbates endothelial damage, activates coagulation, and mediates cytotoxicity, resulting in edema, hemorrhage, microvascular thrombosis, and neutrophil congestion in the lungs. Given that circulating histones directly contribute to these conditions, they may serve as a useful marker to assess the risk of multiple organ failure due to severe trauma.

While an ELISA is typically required to detect protein biomarkers, the inherent properties of histones can be leveraged for direct detection. Histones comprise eight individual histone proteins, specifically two of each of the four core proteins (H2A, H2B, H3, H4); a histone octamer is composed of an H3-H4 tetramer and two H2A-H2B dimers. Intracellularly, negatively charged DNA wraps around positively charged histones to form nucleosomes for compact storage when the DNA is not being replicated. This relationship between DNA and histones has previously been employed to directly quantify histones in assays.

One existing DNA-based solution uses DNA absorbed onto fluorescent carbon dots via electrostatic interactions to quench the fluorescence from the carbon dot. As histones are added to the assay, DNA preferentially binds to the histones, unquenching the carbon dots, thus leading to a dependence of fluorescence signal on histone concentration. Another solution that directly quantifies histone concentration uses a molecular beacon approach in which a DNA-Cy3 probe is immobilized onto a gold surface that acts as a fluorescence quencher. When histones are introduced into the assay, they are wrapped by the DNA-Cy3 probe, pulling the probe toward the gold, and quenching the fluorescence. An alternative DNA-based assay utilizes Förster resonance energy transfer (FRET) to quantify histones. This system uses a cationic conjugated polymer to serve as the FRET donor and SYBR Green I (a fluorescent intercalator that can strongly fluoresce when bound to DNA) to serve as the acceptor. In the absence of histones, DNA with intercalated SYBR Green I is introduced to cationic conjugated polymer, emitting fluorescence due to the energy transfer from polymer to intercalator. The introduction of histones prevents SYBR Green I from intercalating, decreasing the FRET efficiency between the polymer and the intercalator. Although faster and simpler than an ELISA, these solutions are demonstrated using histones in serum. However, serum samples are not congruent with sample-to-answer diagnostics employed in a non-laboratory setting by first responders or emergency department personnel. Instead, single-step detection of histones from whole blood is necessary.

Although there have been developments focused on simplifying assay chemistry, sample preparation (in particular, whole blood preparation) remains largely unsuitable for point-of-care settings. To be considered sample-to-answer, histone detection must be done directly from blood samples with no prior manipulation. Due to the optical absorbance of red blood cells, whole blood samples first need to be separated, rapidly and automatically, without the use of equipment.

There is therefore a need to develop sample-to-answer detection methods and apparatuses capable of detecting the histone complex at clinically relevant levels.

There is a further need to develop sample-to-answer detection methods and apparatuses which use and can rapidly separate whole blood samples.

BRIEF SUMMARY

The present disclosure relates to assay compositions comprising: a red blood cell aggregator; a hydrocarbon; a target molecule comprising nucleic acids; and a detectable label; wherein the hydrocarbon forms a sacrificial layer between one or more of the red blood cell aggregator, the target molecule, and the detectable label.

In an embodiment, the red blood cell aggregator comprises a polysaccharide, a protein, a high molecular weight polymer, or a combination thereof. In a further embodiment, the high molecular weight polymer has a molecular weight of between about 40,000 Da to about 500,000 Da.

In an embodiment, the hydrocarbon comprises hexadecane, octadecane, eicosane, docosane, tetracosane, octacosane, paraffin, lauric acid, palmitic acid, capric acid, propionic acid, caproic acid, caprylic acid, myristic acid, stearic acid, butyric acid, valeric acid, or a combination thereof.

In an embodiment, the target molecule comprises a 10 bp to 2000 bp double-stranded DNA fragment. In a preferred embodiment, the DNA comprises a 147 bp double-stranded DNA fragment from a nucleosome.

In an embodiment, the detectable label is a dye. In a further embodiment, the dye comprises SYBR green, SYBR blue, DAPI, SYBR gold, SYBR Safe, Crystal violet, theophylline, caffeine, acriflavine, proflavine, acridine orange, acridine yellow, quinacrine mustard, adriamycin, daunomycin, thiazole orange, thiazole-coumarin, [9-aminoacridine (9-AA), N2-methyl-9-hydroxy-ellipticine (NMHE), N2,N6-dimethyl-9-hydroxy-ellipticine (DMHE), Hoechst 34580, Hoechst 33342, Hoechst 33258, 4',6-diamidino-2-phenylindole (DAPI), distamycin, chromomycin, phenanthridine, ethidium bromide, propidium iodide, hexidium iodide, dihydroethidium, ethidium homodimer, ethidium monoazide, propidium monoazide, 9-Amino-6-chloro-2-methoxyacridine (ACMA), 7-AAD, LDS 751, hydroxystilbamidine, SYTO-9, SYTO-13, SYTO-16, SYTO-60, SYTO-62, SYTO-82, SYTOX Blue, SYTOX Green, SYTOX Orange, POPO-3, YOYO-1, TOTO-1, TOTO-3, BEBO, LOLO, JOJO, BOBO-3, PO-PRO-3, BO-PRO, TO-PRO-3, JO-PRO, LO-PRO, YO-PRO-1, DiYo, DiTO, SYTO, OPA, NDA, JOE, FAM, Gel Red, fluorescamine, fluorescein, fluorescein isothiocyanate, tetramethyl rhodamine isothiocyanate, rhodamine, tetramethyl rhodamine, pyrene, PicoGreen, dansyl chloride, a compound according to the following formula:

wherein [X] is a substantially aliphatic, substituted, or unsubstituted linker comprising from about 8 to about 150 non-hydrogen atoms; $Q_1$ and $Q_2$ are each a dye constituent selected from a fluorescent nucleic acid dye constituent, a fluorescent non-nucleic acid dye constituent; and/or wherein or when either $Q_1$ or $Q_2$ is a fluorescent nucleic acid dye constituent, at least one of $Q_1$ and $Q_2$ has a structure according to the formula:

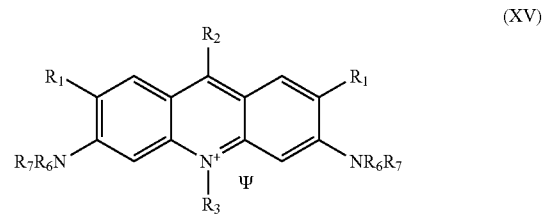

wherein each $R_1$ is independently H or a $C_1$-$C_2$ alkyl; one of $R_2$ and $R_3$ represents where [X] attaches to the structure such that when $R_2$ represents where [X]attaches to the structure, $R_3$ is H or —$CH_3$; when $R_3$ represents where [X] attaches to the structure, $R_2$ is selected from H, —$CH_3$, —$NH_2$, —$NHCH_3$, —CN, and —C(=O)$NH_2$; wherein each $R_6$ is independently H or a $C_1$-$C_2$ alkyl; each $R_7$ is independently H or a $C_1$-$C_2$ alkyl; wherein for each pair of adjacent $R_6$ or $R_7$ and $R_1$, independently, $R_6$ or $R_7$ and $R_1$ may in combination form a 5- or 6-membered, saturated or unsaturated ring; and wherein Ψ is an anion; or a combination thereof.

Further disclosed herein are methods of making an assay composition comprising: (a) adding a red blood cell aggregator and a detectable label to a sample container; (b) adding a liquid hydrocarbon to the sample container and solidifying the liquid hydrocarbon to form a solid sacrificial layer; (c) adding a target molecule to the sample container on top of the solid sacrificial layer; (d) optionally repeating step (b); (e) optionally adding one or more of an additional red blood cell aggregator, additional detectable label, additional target molecule, or additional ingredient to form one or more additional layers; and (f) optionally repeating steps (d) and (e); wherein in the presence of heat, the solid sacrificial layer becomes a liquid hydrocarbon thereby allowing the assay composition to mix.

In an embodiment, the red blood cell aggregator comprises a polysaccharide, a protein, a high molecular weight polymer, or a combination thereof; the liquid hydrocarbon comprises hexadecane, octadecane, eicosane, docosane, tetracosane, octacosane, paraffin, lauric acid, palmitic acid, capric acid, propionic acid, caproic acid, caprylic acid, myristic acid, stearic acid, butyric acid, valeric acid, or a combination thereof; the target molecule comprises 10 bp to 2000 bp double-stranded DNA fragment, more preferably a 147 bp double-stranded DNA fragment from a nucleosome; and the detectable label comprises SYBR green, SYBR blue, DAPI, propidium iodine, SYBR Gold, SYBR Safe, EvaGreen, Crystal violet, ethidium bromide, fluorescein, dansyl chloride, or a combination thereof.

In an embodiment, the sample container comprises a capillary, chamber, reservoir, cuvette, microfuge tube, test tube, planar container, microfluidic channel, conical centrifuge tube, or a combination thereof.

Also disclosed herein are methods of detecting an analyte and predicting a risk of multiple organ failure comprising: (a) collecting a raw sample from an individual; (b) contacting the raw sample with a sample container comprising an assay composition comprising a red blood cell aggregator; a hydrocarbon; a target molecule comprising nucleic acids; and a detectable label; wherein the hydrocarbon forms a sacrificial layer between one or more of the red blood cell aggregator, the target molecule, and the detectable label; (c) exposing the sample container and the raw sample to heat thereby allowing the raw sample and the assay composition to form a mixture; (d) exposing the mixture to a light source; (e) detecting an excitation output from the mixture; (f) translating the excitation output into an analyte concentration; and (g) using the analyte concentration to predict the risk of multiple organ failure.

According to an embodiment, the analyte comprises a histone, and the analyte has an indirect relationship with the excitation output.

In an embodiment, the raw sample comprises whole blood. In a further embodiment, the sample container comprises a capillary, chamber, reservoir, cuvette, microfuge tube, test tube, a planar container, a microfluidic channel, conical centrifuge tube, or a combination thereof.

Also disclosed herein are portable sample readers for detecting an analyte and analyzing a sample comprising: an optical system comprising a light source, a filter, and one or more of a photosensor, a detector, or an imager; and a housing unit configured to receive one or more sample containers.

In an embodiment, the light source comprises a light emitting diode (LED); and/or the filter comprises a band-pass filter, a long-pass filter, a short-pass filter, or a combination thereof. In a further embodiment, the photosensor comprises a photosensor chip or cartridge; the detector comprises a photodetector; and/or the imager comprises a compact camera, bridge camera, DSLR camera, high-resolution microscopy camera, CMOS camera, sCMOS camera, CCD-chip camera, USB camera, USB camera controller board, or a combination thereof.

In an embodiment, the sample container comprises a capillary, chamber, reservoir, cuvette, microfuge tube, test tube, a planar container, a microfluidic channel, conical centrifuge tube, or a combination thereof.

According to an embodiment, the portable sample reader further comprises one or more of a sample holder, a cooling element, a heating element, memory storage, a reader interface, a bar code reading system, a power source, and an algorithm for sample analysis and/or quality checks. In an embodiment, the algorithm analyzes the sample according to the following steps: relevant detection threshold is set, the algorithm carries out one or more of the following steps: (1) taking an image (preferably a fluorescence image) of a control container comprising a detectable label, a sample container, or a combination thereof; (2) identifying containers comprising the detectable label; (3) measuring the detectable label in the sample container, in the control container, or a combination thereof (e.g., the intensity of fluorescence from a dye); (4) reporting the concentration of the detectable label in the containers that were measured; and optionally (5) normalizing the concentration value for the sample container with the concentration value for the control container.

In an embodiment, the measuring occurs in all or in a representative portion of the sample container. In an embodiment, the detectable label is nucleic acid dye fluorescence, the image taken is a fluorescence image such as a photo, and the measurement of the detectable label is a measurement of the grayscale pixel value. In an embodiment, a reverse sigmoidal curve fit (e.g., in MATLAB) is used to model a curve for detectable label measurements (e.g., histone levels), permitting the conversion between the fluorescent image and a numerical value for fluorescence intensity.

Also disclosed herein is a kit comprising one or more sample containers comprising an assay composition comprising a red blood cell aggregator; a hydrocarbon; a target molecule comprising nucleic acids; and a detectable label; wherein the hydrocarbon forms a sacrificial layer between one or more of the red blood cell aggregator, the target molecule, and the detectable label; a sample reader comprising an optical system comprising a light source, a filter, and one or more of a photosensor, a detector, or an imager, and a housing unit configured to receive one or more sample containers; a sample collector comprising a lancet, a collection cup, a vial, a swab, or a combination thereof; and optionally one or more of a power source, an instruction manual for using the kit, and a carrier for storage and transport of the kit.

Further described herein are systems for predicting the risk of multiple organ failure comprising:
(1) an algorithm for predicting the risk of multiple organ failure stored on a non-transitory computer-readable medium capable of receiving one or more inputs;
(2) a sample reader comprising an optical system comprising a light source, a filter, and one or more of a photosensor, a detector, or an imager, and a housing unit configured to receive one or more sample containers;
(3) one or more sample containers containing therein an assay composition comprising a red blood cell aggregator, a hydrocarbon, a target molecule comprising nucleic acids, and a detectable label, wherein the hydrocarbon forms a sacrificial layer between one or more of the red blood cell aggregator, the target molecule, and the detectable label;

wherein the algorithm carries out one or more of the following steps: (a) taking an image (preferably a fluorescence image) of a control container comprising a detectable label, a sample container, or a combination thereof; (b) identifying containers comprising the detectable label; (c) measuring the detectable label in the sample container, in the control container, or a combination thereof (e.g., the intensity of fluorescence from a dye); (d) reporting the concentration of the detectable label in the containers that were measured; and optionally (e) normalizing the concentration value for the sample container with the concentration value for the control container.

It is a further advantage that the methods and apparatuses of the disclosure utilize a high molecular weight polymer to induce red blood cell aggregation. Beneficially, the aggregation is rapid, allowing for separation to occur before the fluorescence measurement is taken.

While multiple embodiments are disclosed, still other embodiments of the present disclosure will become apparent based on the detailed description, which shows and describes illustrative embodiments of the disclosure. The foregoing summary is illustrative only and is not intended to be in any way limiting. In addition to the illustrative aspects, embodiments, and features described above, further aspects, embodiments, and features of the present technology are apparent from the following drawings and the detailed description, which shows and describes illustrative embodiments of the present technology. Each feature of the technology described herein may be combined with any one or more other features of the disclosure, e.g., the methods may be used with any composition described herein. Accordingly, the drawings and detailed description are to be regarded as illustrative and not restrictive.

Figure 1:
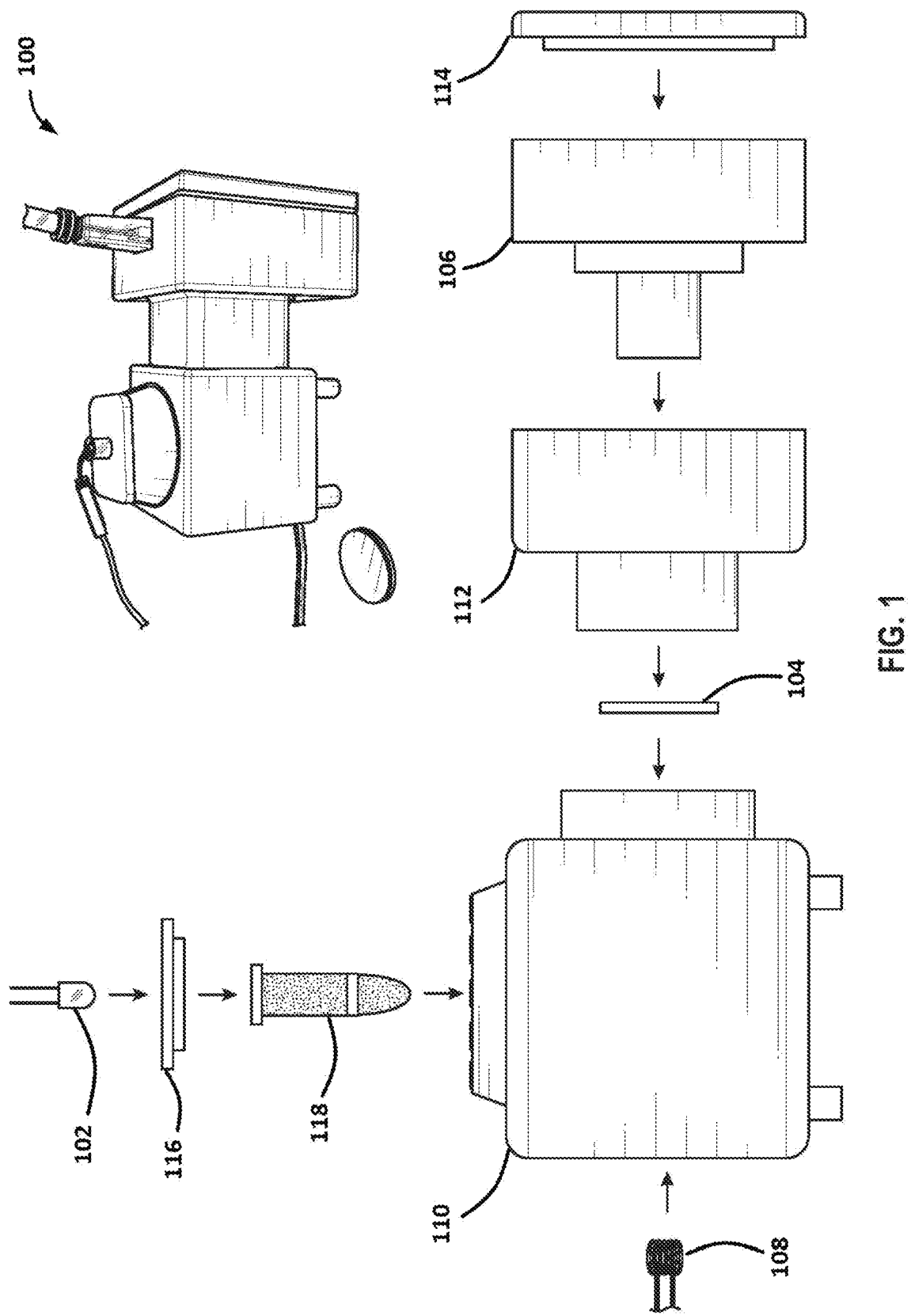
FIG. 1 shows an example embodiment of a sample reader 100 according to the present disclosure, wherein the sample reader 100 is configured to receive a sample container 118 such as a test tube.

Various embodiments of the present disclosure will be described in detail regarding the drawings. Reference to various embodiments does not limit the scope of the disclosure. Figures represented herein are not limitations on the various embodiments according to the disclosure and are presented as example illustrations of the disclosure.

DETAILED DESCRIPTION

The present disclosure relates to point-of-care diagnostic systems that utilize the inherent interactions between histones and DNA for fluorescence-based detection of histones in whole blood. In the assay, histones within the sample are wrapped by DNA within the assay, thus preventing EvaGreen from intercalating and fluorescing. To allow for quantitative fluorescent measurements to be made in a point-of-care setting, a rapid, automated blood separation step is integrated into the assay. Furthermore, manual reagent additions are eliminated by using a phase-change valve, implemented with a sacrificial partition comprising a higher-order alkane, thus making the system sample-to-answer. The assay beneficially demonstrates efficacy in a portable fluorescence reader compatible with a point-of-care environment. A limit of detection of 112 ng/mL in whole blood is achieved, suggesting that the device can be used to rapidly diagnose internal trauma, severity, and by extension the likelihood of multiple organ failure in near-patient settings.

A still further benefit of the present disclosure is the development and use of one or more sacrificial partitions that separate the histone reaction with stored DNA from the other required reagents and, when the reagents are lyophilized, results in a shelf-stable sample collector and eliminating the manual addition of reagents.

The embodiments of this invention are not limited to particular systems and methods for stabilizing and storing raw samples containing nucleic acids, particularly whole blood and plasma samples, which can vary. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in their SI accepted form.

Numeric ranges recited within the specification are inclusive of the numbers within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range (e.g., 1 to 5 includes 1, 1.5, 2, 2%, 3, 3.80, 4, and 5).

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about," the claims include equivalents to the quantities.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes a structure capable of performing a task or adopting a particular configuration. The term "configured" can be used interchangeably with other similar phrases, such as constructed, arranged, adapted, manufactured, and the like. It is further noted that terms characterizing sequential order, a position, and/or orientation are not limiting and are only referenced according to the views presented.

The terms "actives," "percent actives," and "actives concentration" are used interchangeably herein and refer to the concentration of those ingredients involved in cleaning expressed as a percentage minus inert ingredients such as water or salts.

The terms "nucleic acid," "oligonucleotide" and "polynucleotide" may be used interchangeably and encompass DNA, RNA, and cDNA, whether single-stranded or double-stranded, as well as chemical modifications thereof and artificial nucleic acids (e.g., PNA, LNA, etc.). The source of the nucleic acids may vary, including but not limited to commercially-available RNA or DNA fragments.

As used herein, the terms "raw sample," "raw material," "whole sample" and "whole material" refer to a basic substance in its natural, modified, or semi-processed state wherein the material is not yet fully processed or prepared. The raw samples of the present application generally contain wholly or a high quantity of intact cells, i.e., cells that have not yet been intentionally lysed. Although some cells in a raw sample may be ruptured due to natural causes or the state of the sample upon collection, a raw sample according to the present application does not contain cells intentionally ruptured, or otherwise processed or prepared.

As used herein, the term "whole blood" means blood having none of the constituent components removed or intentionally separated. Whole blood contains, for example, red cells, white cells, and platelets suspended in blood plasma. Whole blood generally comprises approximately 55% plasma, 45% red blood cells, and <1% white blood cells and platelets. The whole blood may include components endemic to whole blood, and the whole blood may also include components nonnative to whole blood, for example, viral, bacterial, pharmaceutical, or other microorganism materials.

As used herein, the terms "ambient temperature" and "room temperature" refer to a temperature range from about 18° C. to about 27° C., or from about 20° C. to about 25° C., or from about 22° C. to about 40° C. In other embodiments, the term "ambient temperature" or "room temperature" refers to a temperature of about 18° C., 19° C., 20° C., 21° C., 22° C., 23° C., 24° C., 25° C., 26° C., or 27° C. In certain embodiments, the term "ambient temperature" or "room temperature" refers to a temperature of about 22° C., 37° C., 39° C., or 42° C.

As used herein, the term "histone" refers generally to a type of protein typically found in chromosomes. Histones bind to DNA, assisting in chromosome shape and gene control. Histones may be in the form of an individual histone, a dimer, a tetramer, or an octamer. A histone octamer is an eight-protein complex found at the center of a nucleosome core and comprising two copies of each of the four core histone proteins (H2A, H2B, H3, and H4). A tetramer comprises two copies of each of H3 and H4. A dimer is comprised of H2A and H2B. The present disclosure is particularly concerned with circulating histones. Circulating histones (CHs) are a group of damage-associates molecular pattern histones derived largely from neutrophil extracellular traps. CHs play an important role in multiple organ failure by mediating inflammation response, organ injury, and death through Toll-like receptors or inflammasome pathways.

The term "damage-associated molecular pattern (DAMP) proteins" refers to endogenous danger molecules that are generally released from damaged or dying cells. They activate the immune system by interacting with pattern recognition receptors (PRRs) and promote pathological inflammatory responses.

"Near-patient setting" and "near-patient testing" refer to any location outside a laboratory environment and testing performed in said location. Frequently, near-patient testing involves testing performed by a healthcare professional but not necessarily a laboratory technician. The location of testing is generally near to, or at the side of, the patient. These terms are often used interchangeably with "point-of-care."

The term "sample-to-answer" refers to a platform that is fully integrated such that it can perform an analysis of complex biological samples on a largely or fully automated basis. For example, after sample collection, a sample-to-answer platform may rely on fully automated assays (i.e., assays involving no manual processing steps) that catalyze a reaction, a device that records and analyzes that reaction while requiring little or no user input, and a read-out system that provides the user with rapid test results. A benefit of sample-to-answer platforms is that they provide fast and easy testing in a near-patient setting. A further benefit of such platforms is that they are completely self-contained, eliminating the risk of sample contamination and user error. A still further benefit of such platforms is that rapid diagnosis enabled by sample-to-answer platforms can be leveraged to provide a patient with necessary treatment in a much shorter timeframe, thereby improving overall outcome and preventing multiple organ failure or death.

As used herein, the term "traumatic injury" includes any physical injury of a sudden onset and severity which requires immediate medical attention. The injury may cause system shock and may require rapid intervention to save a patient's life.

As used herein, the term "internal trauma" refers to any trauma or traumatic injury that involves one or more organs or cavities of the body.

The term "multiple organ dysfunction syndrome" or "MODs" refers to the development of a potentially reversible physiologic derangement involving two or more organ systems not involved in the disorder or injury that required immediate medical intervention or admission to an emergency room and arising in the wake of a potentially life-threatening traumatic injury or physiologic insult. Some of the more prominent manifestations of MODs include acute respiratory distress syndrome (ARDS) and disseminated intravascular coagulation (DIC).

As described here, the terms "molecular biomarker" and "biomarker" refer generally to any measurable substance whose presence is indicative, whether directly or indirectly, of some phenomenon such as disease, infection, or risk thereof. These terms are used herein interchangeably with "analyte."

Several abbreviations and acronyms are used herein. Key abbreviations are as follows: DAMP refers to "damage-associated molecular pattern." "TLR" refers to Toll-like receptors. "FRET" is Förster resonance energy transfer. "FBS" is an acronym for fetal bovine serum. "IUPAC" is an acronym for the International Union for Pure and Applied Chemistry. "ISO" refers to the International Organization for Standardization. "CLSI" refers to the Clinical and Laboratory Standards Institute. "PHAST" refers to portable histone assay technology.

The term "hydrocarbon" as used herein is inclusive both of hydrocarbons and compounds containing hydrocarbons. That is, the term "hydrocarbon" includes organic compounds consisting entirely of hydrogen and carbon, such as alkanes and alkenes. The term "hydrocarbon" also includes compounds having one or more hydrocarbon chains or groups, such as fatty acids having long, unbranched hydrocarbons with a carboxylic acid group at one end.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

Alkenyl groups or alkenes are straight chain, branched, or cyclic alkyl groups having two to about 30 carbon atoms, and further including at least one double bond. In some embodiments, an alkenyl group has from 2 to about 30 carbon atoms, or typically, from 2 to 10 carbon atoms. Alkenyl groups may be substituted or unsubstituted. For a double bond in an alkenyl group, the configuration for the double bond can be a trans or cis configuration. Alkenyl groups may be substituted similarly to alkyl groups.

Alkynyl groups are straight chain, branched, or cyclic alkyl groups having two to about 30 carbon atoms, and further including at least one triple bond. In some embodiments, an alkynyl group has from 2 to about 30 carbon atoms, or typically, from 2 to 10 carbon atoms. Alkynyl groups may be substituted or unsubstituted. Alkynyl groups may be substituted similarly to alkyl or alkenyl groups.

As used herein, the terms "alkylene", "cycloalkylene", "alkynylides", and "alkenylene", alone or as part of another substituent, refer to a divalent radical derived from an alkyl, cycloalkyl, or alkenyl group, respectively, as exemplified by —CH$_2$CH$_2$CH$_2$—. For alkylene, cycloalkylene, alkynylene, and alkenylene groups, no orientation of the linking group is implied.

The term "ester" as used herein refers to a —RCOOR' group. R is absent, a substituted or unsubstituted alkylene, cycloalkylene, alkenylene, alkynylene, arylene, aralkylene, heterocyclylalkylene, or heterocyclylene group as defined herein. R' is a substituted or unsubstituted alkyl, cycloalkyl, alkenyl, alkynyl, aryl, aralkyl, heterocyclylalkyl, or heterocyclyl group as defined herein.

The term "amine" (or "amino") as used herein refers to —RNR'R" groups. R is absent, a substituted or unsubstituted alkylene, cycloalkylene, alkenylene, alkynylene, arylene, aralkylene, heterocyclylalkylene, or heterocyclylene group as defined herein. R' and R" are independently hydrogen, or a substituted or unsubstituted alkyl, cycloalkyl, alkenyl, alkynyl, aryl, aralkyl, heterocyclylalkyl, or heterocyclyl group as defined herein.

The term "amine" as used herein also refers to an independent compound. When an amine is a compound, it can be represented by a formula of R'NR'R" groups, wherein R, R', and R" are independently hydrogen, or a substituted or unsubstituted alkyl, cycloalkyl, alkenyl, alkynyl, aryl, aralkyl, heterocyclylalkyl, or heterocyclyl group as defined herein.

The term "alcohol" as used herein refers to —ROH groups. R is absent, a substituted or unsubstituted alkylene, cycloalkylene, alkenylene, alkynylene, arylene, aralkylene, heterocyclylalkylene, or heterocyclylene group as defined herein.

The term "carboxylic acid" as used herein refers to —RCOOH groups. R is absent, a substituted or unsubstituted alkylene, cycloalkylene, alkenylene, alkynylene, arylene, aralkylene, heterocyclylalkylene, or heterocyclylene group as defined herein.

As used herein, "substituted" refers to an organic group as defined below (e.g., an alkyl group) in which one or more bonds to a hydrogen atom contained therein are replaced by a bond to non-hydrogen or non-carbon atoms. Substituted groups also include groups in which one or more bonds to carbon(s) or hydrogen(s) atoms replaced by one or more bonds, including double or triple bonds, to a heteroatom. Thus, a substituted group is substituted with one or more substituents, unless otherwise specified. A substituted group can be substituted with 1, 2, 3, 4, 5, or 6 substituents.

Substituted ring groups include rings and ring systems in which a bond to a hydrogen atom is replaced with a bond to a carbon atom. Therefore, substituted cycloalkyl, aryl, heterocyclic, and heteroaryl groups may also be substituted with substituted or unsubstituted alkyl, alkenyl, and alkynyl groups defined herein.

Assay Compositions

The present disclosure relates to an assay composition comprising a red blood cell aggregator, a sacrificial partition, a target molecule, and a detectable label. In a preferred embodiment, the red blood cell aggregator comprises a high molecular weight polymer such as dextran, the sacrificial partition comprises a hydrocarbon such as a higher-order alkane, the target molecule comprises a DNA source, and the detectable label comprises an intercalating nucleic acid dye. In a preferred embodiment, the alkane acts as a sacrificial partition such that the nucleic acid dye and red blood cell aggregator are stored below the alkane partition while the DNA source is stored above the alkane partition before use of the assay. After a whole blood sample is added to the assay, the assay is subjected to an increased temperature sufficient to transform the alkane partition from a solid to a liquid, thereby automatically releasing the DNA and whole blood sample into the rest of the assay. Beneficially, the assay compositions disclosed herein permit sample-to-answer analyte detection in a whole blood sample using automated reagent addition, whole blood separation, and fluorescence. Thus, the sample-to-answer assay enables clinically relevant detection of histones as a biomarker for trauma-induced multiple organ failure.

However, the assay compositions disclosed herein may be utilized to detect and quantify any clinically relevant analyte or biomarker, particularly those indicative or predictive of organ failure. Examples of analytes/biomarkers include, but are not limited to, histones (including individual histones, dimers, trimers, and octamers), cytokines, such as interleukins (e.g., interleukin 2, interleukin 4, interleukin 1, interleukin 6), ALT, AST, creatinine, bilirubin, platelet count, EPC, miRNA, exosomes, cfDNA, nucleosomes, neutrophils, such as neutrophil gelatinase-associated lipocalin, Protein C, or a combination thereof. Further discussion of analytes is found in Shapiro, et al., *A prospective, multi-center derivation of a biomarker panel to assess risk of organ dysfunction, shock, and death in emergency depart-* ment patients with suspected sepsis, Crit. Care Med. 2009 37(1): 96-104, and Dao et al., *The Organ Trail: A Review of Biomarkers of Organ Failure*, Front. Oncol. 2020; 10: 579219, and Abrams, et al. *Circulating Histones Are Mediators of Trauma-associated Lung Injury*, Am. J. Respir. Crit. Care Med. 2013 Jan. 15; 187(2):160-9, all of which are herein incorporated by reference in their entirety.

TABLE 1

Assay Compositions

| Component | Ex. 1 | Ex. 2 |
|---|---|---|
| Red blood cell aggregator | 1 g/dL-15 g/dL | 0.5 g/dL-30 g/dL |
| Sacrificial partition | 0.5 µL-10 µL | 0.1 µL-50 µL |
| Target molecule | 10 mM-10,000 mM | 1 mM-50,000 mM |
| Detectable label | 1.25 µM-25 µM | 0.1 µM-50 µM |
| Additional optional ingredients | Remainder | Remainder |

Red Blood Cell Aggregator

In an embodiment, the assay compositions described herein include one or more red blood cell aggregators. A red blood cell aggregator is a compound that accelerates the separation of red blood cells from the other components of whole blood, often by forming molecular bridges between red blood cells. The bridges reduce the distance between the red blood cells, thereby reducing the effect of the normal repulsive forces between these cells. Once the repulsive forces of the negatively charged groups of red blood cell surface have been overcome, the adsorptive forces of the lipoidal red blood cell surface hold adjacent cells together. Aggregators, therefore, cause red blood cells to aggregate into large masses. Suitable aggregators include, but are not limited to, polysaccharides, proteins, and high molecular weight polymers. In a preferred embodiment, the red blood cell aggregator is a high molecular weight glucose polymer.

Examples of suitable red blood cell aggregators include, but are not limited to polyvinylpyrrolidone (PVP), a polymer of arabinose, glucose, galactose, or a combination thereof, a polymer formed from the copolymerization of sucrose and epichlorohydrin, such as Ficoll, heparin, pentaspan, gamma globulin, fibrinogen, or a combination thereof. More particularly, the red blood cell aggregator may comprise a polymer of arabinose and galactose, such as gum arabic, a polymer of glucose, such as dextran, or a dextran derivative (such as dextran sulfate or cationic dextran), or a combination thereof.

In an embodiment, the red blood cell aggregator is a high molecular weight polymer having a molecular weight of between about 40,000 and about 500,000, and more preferably between about 100,000 and about 200,000. Preferably, the high molecular weight polymer is a polysaccharide such as dextran.

The red blood cell aggregator may be present in the assay compositions in an amount of between about 1 g/dL to about 15 g/dL, preferably between about 1 g/dL to about 10 g/dL, and still more preferably between about 5 g/dL to about 10 g/dL, inclusive of all integers within these ranges.

Coagulation Modifier

The assay compositions disclosed herein may optionally include one or more coagulation modifiers such as anticoagulating agents, also referred to as anticoagulants, and/or one or more anticoagulant reversal agents. Whether the assay includes an anticoagulant or an anticoagulant reversal agent will depend on the particular assay and the type and composition of the sample. For example, if a sample of whole blood contains one or more anticoagulants, it may be desirable to include one or more anticoagulant reversal agents in the assay.

The use of one or more anticoagulants may be useful in maintaining the homogeneity of the blood as well as preventing unwanted degradation, clotting, or agglomeration. The most common anticoagulants fall into two categories polyanions (e.g. Heparin) or metal chelators (e.g. EDTA, citrate). More particularly, suitable anticoagulants include, but are not limited to, citrate, citrate dextrose, citrate phosphate dextrose, citrate phosphate dextrose adenine, sodium citrate, K2 EDTA, K3 EDTA, sodium EDTA, lithium heparin, sodium heparin, potassium, oxylate, or a combination thereof.

The use of one or more anticoagulant reversal agents may be useful in reversing the effects of anticoagulants and supporting agglomeration in a whole blood sample. More particularly, an anticoagulant reversal agent may assist in the separation of red blood cells from a whole blood sample. Suitable anticoagulant reversal agents include, but are not limited to, a multivalent cation or salt thereof, FEIBA, PCC, and rFVIIa, or a combination thereof. More particularly, the multivalent cation may comprise calcium ions or a salt thereof, such as calcium chloride ($CaCl_2$)).

When present, the coagulation modifying agent may be present in an amount of between about 10 mM to about 100 mM, more preferably between about 20 mM to about 75 mM, and still more preferably between about 45 mM to 55 mM, inclusive of all integers within these ranges.

Sacrificial Partition

The assay compositions preferably include a sacrificial partition that can be released or dissolved, preferably using heat. More particularly, the partition is preferably solid at ambient temperature and serves to separate one or more components of the assay composition. Upon application of a releasing agent, such as heat, the sacrificial partition is dissolved, released, or otherwise opened to permit the components of the assay to mix.

The partition may be comprised of a hydrocarbon or wax, plastic, or other material that can form a solid or semi-solid obstruction in a capillary, chamber, reservoir, cuvette, sample tube, or another container. In some embodiments, the partition is also fluid-tight. Preferably, the sacrificial partition is melted or deformed to remove the obstruction with the application of heat. In a preferred embodiment, the sacrificial partition is comprised of a solid, semi-solid, or viscous liquid hydrocarbon. Still more preferably, the sacrificial partition is comprised of a higher-order alkane. Examples of suitable materials for the sacrificial partition include, but are not limited to, monodisperse hydrocarbons such as hexadecane, octadecane, eicosane, docosane, tetracosane, octacosane, hydrocarbons such as paraffin, and fatty acids such as lauric acid, palmitic acid, capric acid, propionic acid, caproic acid, caprylic acid, myristic acid, stearic acid, butyric acid, valeric acid, or a combination thereof.

The sacrificial partition may also comprise a cross-linked polymer that displays thermal recovery, most preferably a cross-linked, prestressed, semicrystalline polymer. Using these materials, at a temperature less than the melting temperature, the polymer occludes a container, such as a channel, tube, chamber, cuvette, or the like. At a temperature greater than the melting temperature, however, the polymer reverts to its prestressed dimensions by shrinking. Such shrinking is accompanied by the release of the partition into the sample container. In another embodiment, the sacrificial partition comprises a thin polymeric layer or barrier dividing a container, such as a channel, tube, chamber, cuvette, or the like, that can burst when sufficient temperature and/or pressure is applied.

In an embodiment, the sacrificial partition may be added to the container in a single step or in a series of steps. The sacrificial partition may be present in an amount of between about 0.5 µL to about 10 µL, from about 1 µL to about 5 µL, and still more preferably from about 1 µL to about 3 µL, inclusive of all integers within these ranges.

Target Molecule

The assay compositions disclosed herein may include a target molecule that is targeted by a detectable label in order to provide identification and quantification of the target molecule. The target molecule can be the same compound as the clinically relevant biomarker/analyte such that the target molecule provides a direct indication of the concentration of the analyte/biomarker. Alternatively, the target molecule can be a different compound than the clinically relevant analyte/biomarker, such that the target molecule provides an indirect indication of the concentration of the analyte/biomarker. For example, in an embodiment of the present disclosure, the target molecule is double-stranded DNA that is capable of binding both with a detectable label comprising a fluorescent dye and an analyte comprising one or more circulating histones. Preferably, the fluorescent dye will only intercalate into the DNA target molecules that are not bound to a histone. Thus, an inverse relationship between fluorescence signal and histone concentration is observed, enabling quantification of the histone analyte in a sample.

The target molecule can include but is not limited to, MBL or a portion thereof, FcMBL, AKT-FcMBL, wheat germ agglutinin, lectins, antibodies (e.g., gram-negative antibodies or gram-positive antibodies, antibiotics to specific microbial strains or species), antigen-binding fragments of antibodies, aptamers, ligands (agonists or antagonists) of cell-surface receptors, or a source of nucleic acids, such as DNA or RNA.

In a preferred embodiment, the target molecule comprises a source of nucleic acids, such as DNA or RNA. The source of nucleic acids may be single-stranded or double-stranded and may range from 10 bp to 2000 bp. In a preferred embodiment, the nucleic acid source is DNA capable of binding with or "wrapping around" an analyte, for example circulating histones. In a further preferred embodiment, the labeling molecule is double-stranded DNA having about 100 bp to 300 bp. When the target molecule is DNA, the assay and methods of use thereof (e.g., methods of detecting circulating histones) are beneficially free of antibodies and wash steps, respectively.

The target molecule is present in the assay compositions in an amount of between about 10 mM and about 10,000 mM, preferably between about 50 mM and about 1,000 mM, and still more preferably between about 75 mM to about 150 mM, inclusive of all integers within these ranges.

Detectable Label

The target molecule can include a detectable label, i.e., a compound capable of producing a detectable signal indicative of the presence or concentration of the analyte. The detectable label can be endemic to the target molecule or it can be nonnative, i.e., the result of a dye. Detectable labels include, but are not limited to, any composition detectable by spectroscopic, photochemical, biochemical, immunochemical, electrical, optical, or chemical means. Suitable labels include fluorescent molecules, radioisotopes, nucleotide chromophores, enzymes, substrates, chemiluminescent moieties, bioluminescent moieties, and the like. As such, a label is any composition detectable by spectroscopic, photochemical, biochemical, immunochemical, electrical, optical, or chemical means needed for the methods and devices described herein.

In a preferred embodiment, the detectable label comprises one or more nucleic acid dyes, including, for example, dyes that bind with DNA or RNA either non-specifically or specifically. Suitable dyes include those that stain nucleic acids sufficient to permit detection and quantification. In a preferred embodiment, the dye is a DNA-specific dye that is fluorescent. In a further preferred embodiment, the nucleic acid dye is a DNA-specific fluorescent dye that binds to double-stranded DNA and strongly fluoresces once intercalated with DNA that is not bound to a histone, thereby establishing an inverse relationship between fluorescence signal and histone concentration.

Examples of suitable dyes include, but are not limited to, SYBR green, SYBR blue, DAPI, propidium iodine, SYBR gold, SYBR Safe, EvaGreen, Crystal violet, ethidium bromide, acridines, proflavine, acridine orange, acriflavine, fluorcoumanin, ellipticine, daunomycin, chloroquine, distamycin D, chromomycin, homidium, mithramycin, ruthenium polypyridyls, anthramycin, phenanthridines and acridines, ethidium bromide, propidium iodide, hexidium iodide, dihydroethidium, ethidium homodimer-1 and -2, ethidium monoazide, dUTP-conjugated probes, ACMA, Hoechst 33258, Hoechst 33342, Hoechst 34580, DAPI (4',6-diamidino-2-phenylindole), acridine orange, 7-AAD (7-aminoactinomycin D), LDS751, hydroxystilbamidine, SYTOX Blue, SYTOX Green, SYTOX Orange, POPO-1, POPO-3, YOYO-1, YOYO-3, TOTO-1, TOTO-3, JOJO-1, LOLO-1, BOBO-1, BOBO-3, PO-PRO-1, PO-PRO-3, BO-PRO-1, BO-PRO-3, TO-PRO-1, TO-PRO-3, TO-PRO-5, JO-PRO-1, LO-PRO-1, YO-PRO-1, YO-PRO-3, DiYO-1, DiTO-1, PicoGreen, OliGreen, RiboGreen, SYBR Gold, SYBR Green I, SYBR Green II, SYBR DX, SYTO-40, SYTO-41, SYTO-42, SYTO-43, SYTO-44, SYTO-45 (blue), SYTO-9, SYTO-13, SYTO-16, SYTO-24, SYTO-21, SYTO-23, SYTO-12, SYTO-11, SYTO-20, SYTO-22, SYTO-15, SYTO-14, SYTO-25 (green), SYTO-81, SYTO-80, SYTO-82, SYTO-83, SYTO-84, SYTO-85 (orange), SYTO-64, SYTO-17, SYTO-59, SYTO-61, SYTO-62, SYTO-60, SYTO-63 (red), fluorescein, fluorescein isothiocyanate (FITC), tetramethyl rhodamine isothiocyanate (TRITC), rhodamine, tetramethyl rhodamine, R-phycoerythrin, Cy-2, Cy-3, Cy-3.5, Cy-5, Cy5.5, Cy-7, Texas Red, Phar-Red, allophycocyanin (APC), SYBR Green, Sybr Green I, Sybr Green II, Sybr Gold, CellTracker Green, ethidium homodimer I, ethidium homodimer II, ethidium homodimer III, ethidium bromide, umbelliferone, eosin, green fluorescent protein, erythrosin, coumarin, methyl coumarin, pyrene, malachite green, stilbene, lucifer yellow, cascade blue, dichlorotriazinylamine fluorescein, dansyl chloride, fluorescent lanthanide complexes such as those including europium and terbium, carboxy tetrachloro fluorescein, 5 and/or 6-carboxy fluorescein (FAM), 5- (or 6-) iodoacetamidofluorescein, 5-{[2(and 3)-5-(Acetylmercapto)-succinyl]amino}fluorescein (SAMSA-fluorescein), lissamine rhodamine B sulfonyl chloride, 5 and/or 6 carboxy rhodamine (ROX), 7-amino-methyl-coumarin, 7-Amino-4-methylcoumarin-3-acetic acid (AMCA), BODIPY fluorophores, 8-methoxypyrene-1,3,6-trisulfonic acid trisodium salt, 3,6-Disulfonate-4-amino-naphthalimide, phycobiliproteins, AlexaFluor 350, 405, 430, 488, 532, 546, 555, 568, 594, 610, 633, 635, 647, 660, 680, 700, 750, and 790 dyes, DyLight 350, 405, 488, 550, 594, 633, 650, 680, 755, and 800 dyes, or other fluorophores.

More particularly, the detectable label comprises a nucleic acid dye, such as an intercalating dye, a minor/major groove binder, or other nucleic acid stains. Suitable nucleic acid dyes include, without limitation, SYBR green, SYBR blue, DAPI, SYBR gold, SYBR Safe, Crystal violet, theophylline, caffeine, an acridine dye such as acriflavine, proflavine, acridine orange, acridine yellow, or quinacrine mustard, adriamycin, daunomycin, thiazole orange, thiazole-coumarin, a minor/major groove intercalating dye such as [9-aminoacridine (9-AA), N2-methyl-9-hydroxy-ellipticine (NMHE), N2,N6-dimethyl-9-hydroxy-ellipticine (DMHE), Hoechst 34580, Hoechst 33342, Hoechst 33258, or 4',6-diamidino-2-phenylindole (DAPI), distamycin, chromomycin, phenanthridine, ethidium bromide, propidium iodide, hexidium iodide, dihydroethidium, ethidium homodimer, ethidium monoazide, propidium monoazide, 9-Amino-6-chloro-2-methoxyacridine (ACMA), 7-AAD, LDS 751, hydroxystilbamidine, SYTO-9, SYTO-13, SYTO-16, SYTO-60, SYTO-62, SYTO-82, SYTOX Blue, SYTOX Green, SYTOX Orange, POPO, including for example POPO-3, YOYO, including for example YOYO-1, TOTO, including for example TOTO-1 and TOTO-3, BEBO, LOLO, JOJO, BOBO, including for example BOBO-3, PO-PRO, including for example PO-PRO-3, BO-PRO, TO-PRO, including for example TO-PRO-3, JO-PRO, LO-PRO, YO-PRO, including for example YO-PRO-1, DiYo, DiTO, SYTO, OPA, NDA, JOE, FAM, Gel Red, fluorescamine, fluorescein, fluorescein isothiocyanate, tetramethyl rhodamine isothiocyanate, rhodamine, tetramethyl rhodamine, pyrene, PicoGreen, dansyl chloride, or a combination thereof.

More particularly, the nucleic acid dye may include one or more of the compounds according to the following formulas:

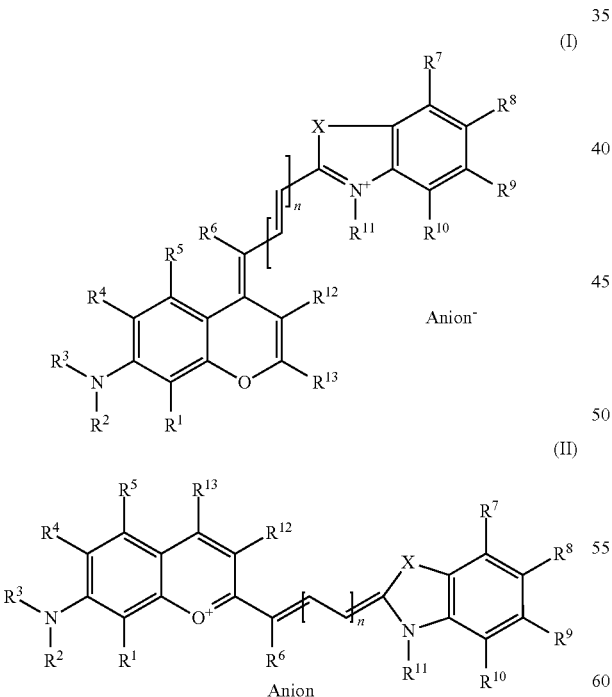

wherein each of $R^1$-$R^{10}$ and $R^{12}$ is independently H or a linear or branched hydrocarbon, optionally containing one or more heteroatoms; $R^1$ and $R^2$, $R^2$ and $R^3$, $R^1$ and $R^4$, $R^4$ and $R^5$, $R^7$ and $R^8$, $R^8$ and $R^9$, $R^9$ and $R^{10}$ or $R^6$ and $R^{12}$ are substituents capable of forming an aliphatic chain or ring, or an aromatic ring; $R^1$ is a linear or branched hydrocarbon, optionally containing one or more heteroatoms; $R^{13}$ is selected from a linear, cyclic, or branched hydrocarbon that is saturated or unsaturated, optionally containing one or more heteroatoms, optionally containing a tetraalkylammonium group; aryl or pyrimidyl; or $NR^{14}R^{15}$ where $R^{14}$ and $R^{15}$ are the same or different and are independently H or a hydrocarbon, optionally containing one or more heteroatoms optionally containing a tetraalkylammonium group, or $R^{14}$ and $R^{15}$ in combination complete a five, six, or seven membered saturated ring, optionally containing one or more heteroatoms optionally containing a quaternary ammonium group; or $R^{13}$ is a linker connecting the rest of the compound to another benzopyrylium methine dye, forming a dimer dye structure. The dyes of the dimer may be the same or different. X is selected from the group consisting of O, S, Se, $NR^{16}$ where $R^{16}$ is H or a hydrocarbon optionally containing one or more heteroatoms, and $CR^{17}R^{18}$ where $R^{17}$ and $R^{18}$ are the same or different and are independently a hydrocarbon optionally containing one or more heteroatoms, or in combination complete a five, six, or seven-membered saturated ring, optionally containing one or more heteroatoms; n is an integer from 0 to 3, and the anion⁻ is a counterion.

In a further embodiment, the nucleic acid dye may include one or more of the compounds according to the following formulas:

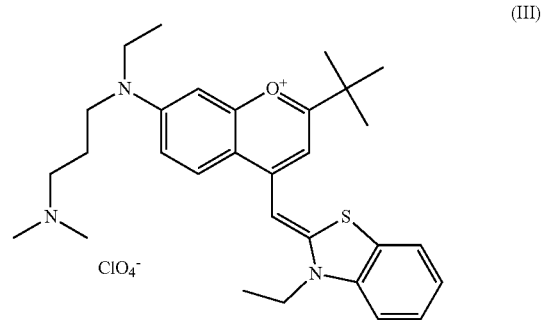

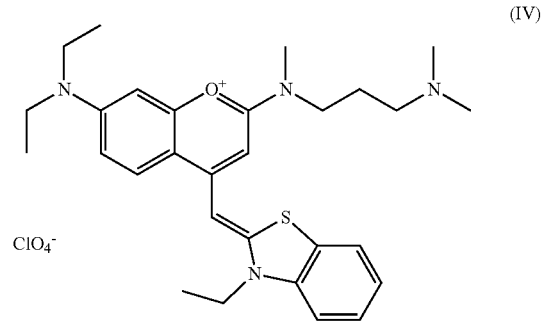

-continued

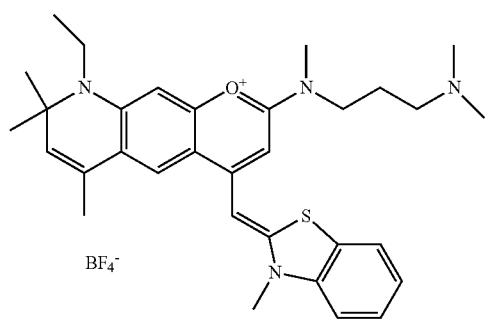
(V)

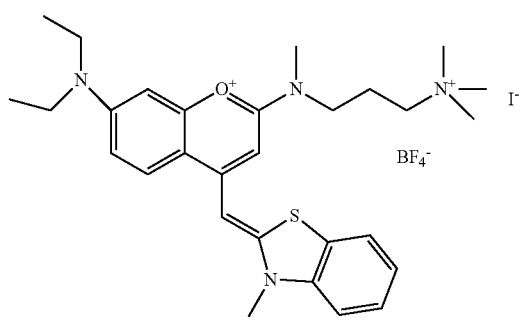
(IX)

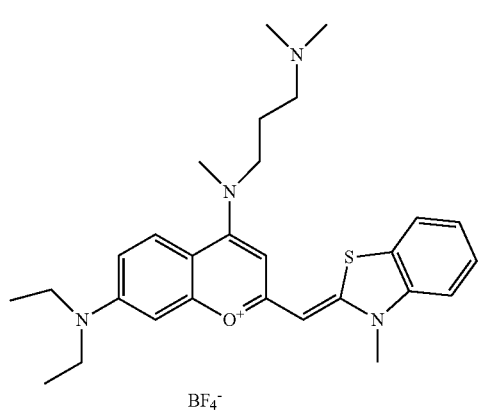
(VI)

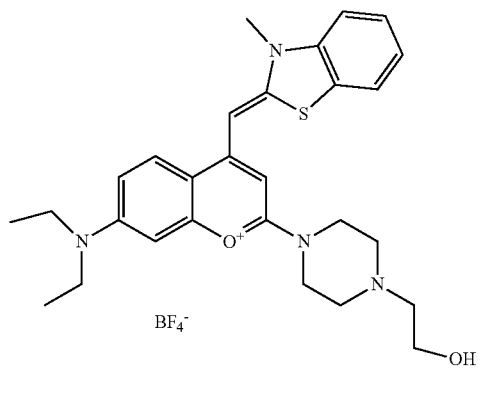
(VII)

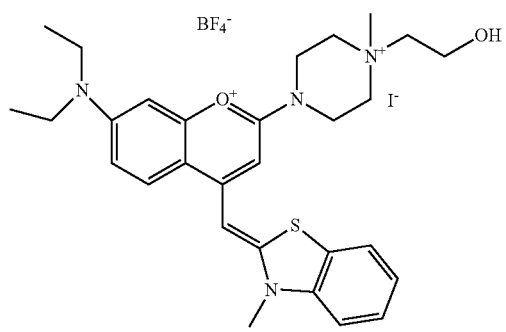
(VIII)

(X)

(XI)

In a further embodiment, the nucleic acid dye may include a compound according to the following formula:

$$Q_1\text{-}[X]\text{-}Q_2 \quad (XII)$$

wherein [X] is a substantially aliphatic, substantially neutral linker comprising from about 8 to about 150 non-hydrogen atoms; $Q_1$ and $Q_2$ are each a dye constituent selected from a fluorescent nucleic acid dye constituent or a fluorescent non-nucleic acid dye constituent; and/or wherein (i) when $Q_1$ and/or $Q_2$ is a phenanthridinium dye, at least one of $Q_1$ and $Q_2$ is a phenanthridinium dye has the structure according to the formula:

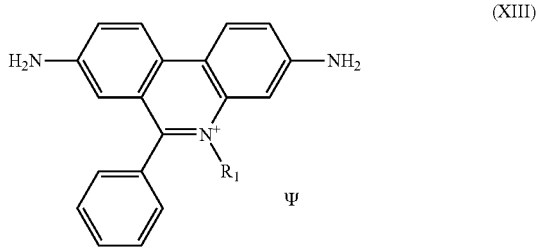

(XIII)

R₁ represents where [X] attaches to the structure, and v is an anion; or (ii) when each of Q₁ and Q₂ is an asymmetric cyanine dye, each of the Q₁ and Q₂ dye constituents has the structure according to the formula:

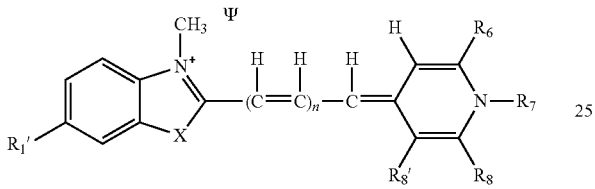

(XIV)

wherein R₁' of Formula (XIV) is H; alkyl or alkenyl having 1 carbon to 6 carbons, inclusive; a halogen; —OR₉; —SR₁₀; —NR₁₁R₁₂; —CN; —NH(C=O)R₁₃; —NHS(=O)₂R₁₄; —C(=O)NHR₁₅; or a substituent associated with minor groove binding; or represents where [X] attaches to the structure; when R₁' of Formula (XIV) comprises at least one of R₉, R₁₀, R₁₁, R₁₂, R₁₃, R₁₄, and R₁₅, any said one of R₉, R₁₀, Ru, R₁₂, R₁₃, R₁₄, and R₁₅, independently, is H or alkyl having 1 carbon to 12 carbons, inclusive, optionally incorporating 1 to 2 nitrogen(s), inclusive, or an aryl; when R₁' of Formula (XIV) comprises Ru and R₁₂, Ru and R₁₂ may in combination form a 5- or 6-membered saturated or unsaturated ring, which optionally comprises at least one hetero atom selected from N and O;

X of Formula (XIV) is selected from O and S; n of Formula (XIV) is selected from 0, 1, and 2; R₆ of Formula (XIV) is H; alkyl or alkenyl having 1 carbon to 10 carbons, inclusive, optionally comprising at least one hetero atom selected from N, O, and S; a halogen; —OR₁₆; —SR₁₆; —NR₁₆R₁₇; or a substituted or an unsubstituted aryl, optionally comprising 1 to 3 hetero atom(s), inclusive, selected from N, O, and S; or represents where [X] attaches to the structure; R₇ of Formula (XIV) is H; alkyl or alkenyl having 1 carbon to 10 carbons, inclusive, optionally comprising an aryl and at least one hetero atom selected from N, O, and S; or a substituted or an unsubstituted aryl optionally comprising 1 to 3 hetero atom(s), inclusive, selected from N, O, and S; or represents where [X] attaches to the structure; R₈ and R₈' of Formula (XIV) in combination form a fused aromatic ring, which may be further substituted 1 to 4 time(s), inclusive, independently, by C1-C2, inclusive, alkyl, C1-C2, inclusive, alkoxy, C1-C2, inclusive, alkylmercapto, or a halogen; each of R₁₆ and R₁₇ independently is H; alkyl having 1 carbon to 12 carbons, inclusive, optionally incorporating 1 to 2 nitrogen(s) or an aryl; or R₁₆ and R₁₇ may in combination form a 5- or 6-membered saturated or unsaturated ring, which optionally comprises at least one hetero atom selected from N and O; only one of R₁', R₆ and R₇ of Formula (XIV) represents where [X] attaches to the structure; and Ψ of Formula (XIV) is an anion; or when either Q₁ or Q₂ is an acridine dye, at least one dye constituent of the Q₁ and Q₂ dye constituents has the structure according to the formula:

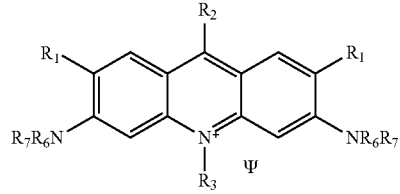

(XV)

wherein each R₁ of Formula (XV) is independently H or a $C_1$-$C_2$ alkyl; one of R₂ and R₃ of Formula (XV) represents where [X] attaches to the structure; when R₂ of Formula (XV) represents where [X] attaches to the structure, R₃ is H or —CH₃; when R₃ of Formula (XV) represents where [X] attaches to the structure, R₂ is selected from H, —CH₃, —NH₂, —NHCH₃, —CN, and —C(=O)NH₂; each R₆ of Formula (XV) independently, is H or a $C_1$-$C_2$ alkyl; each R₇ of Formula (XV) independently, is H or a $C_1$-$C_2$ alkyl; for each pair of adjacent R₆ or R₇ and R₁, independently, R₆ or R₇ and R₁ may in combination form a 5- or 6-membered, saturated or unsaturated ring; and Ψ of Formula (XV) is an anion.

In a further embodiment, the nucleic acid dye may include a compound according to the following formula:

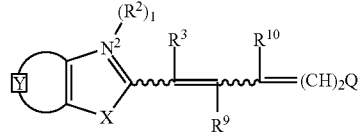

(XVI)

wherein the moiety Y represents an optionally-substituted fused monocyclic or polycyclic aromatic ring or an optionally-substituted fused monocyclic or polycyclic nitrogen-containing heteroaromatic ring; X is oxygen, sulfur, selenium, tellurium or a moiety selected from $C(CH_3)_2$ and $NR^1$, where $R^1$ is hydrogen or $C_{1-6}$alkyl; $R^2$ is selected from the group consisting of $C_{1-6}$alkyl, $C_3$-8 cycloalkyl, aryl, aryl($C_1$-3alkyl), hydroxyalkyl, alkoxy-alkyl, aminoalkyl, mono and dialkylaminoalkyl, trialkyl ammonium alkyl, alkylene carboxylate, alkylene carboxamide, alkylene sulfonate, optionally substituted cyclic heteroatom-containing moieties, and optionally substituted acyclic heteroatom-containing moieties; t=0 or 1; Z is a charge selected from 0 or 1; $R^3$ is selected from the group consisting of hydrogen, $C_1$-6 alkyl, and arylcarbonyl, or $R^2$ and $R^3$ are taken together to form —$(CH_2)_w$—, wherein w is 1 to 5; $R^9$ and $R^{10}$ are each independently selected from the group consisting of hydrogen, $C_1$-6 alkyl, and arylcarbonyl; n=0, 1, or 2; and v=0 or 1; with the proviso that v=0 when $R^2$ and $R^3$ are not taken together to form —$(CH_2)_w$—;

wherein when v=0, Q is a heterocycle selected from the group of structures consisting of:

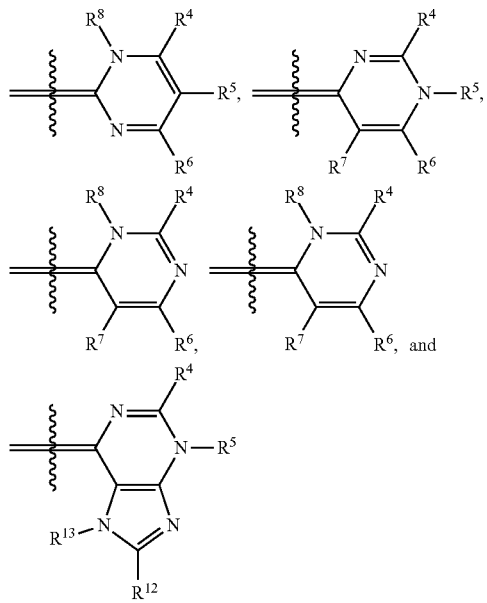

And wherein when v=1, Q is a heterocycle selected from the group of structures consisting of:

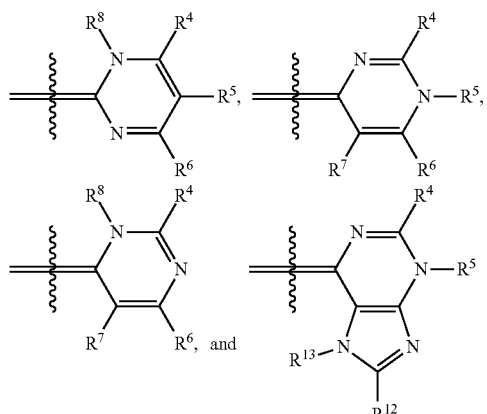

wherein $R^4$, $R^5$, $R^6$, $R^7$, $R^8$, $R^{12}$, and $R^{13}$ are independently selected from the group consisting of hydrogen, halogen, alkyl, cycloalkyl, heteroalkyl, heterocycloalkyl, alkenyl, polyalkenyl, alkynyl, polyalkynyl, alkenylalkynyl, alkylnitrilethio, aryl, heteroaryl, alkoxy, arylcarbonylthio, cycloheteroalkylcarbonylthio, dialkylaminoalkylcarbonylthio, dialkylamino, cycloalkylthio, cycloheteroalkylthio, trialkylammoniumalkylthio, trialkylammoniumalkylcarbonylthio, and nucleosidylthio, each of which may be optionally substituted; an acyclic heteroatom-containing moiety, a cyclic heteroatom-containing moiety, and a reactive group, each of which optionally includes a quaternary ammonium moiety.

In a further embodiment, the nucleic acid dye may include a compound according to the following formula:

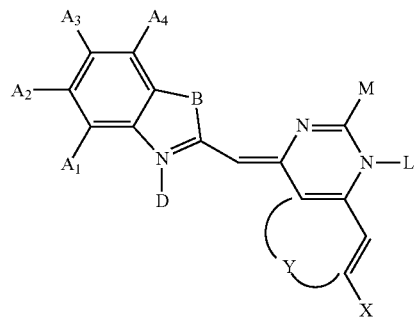

(XVII)

wherein either all of $A_1$, $A_2$, $A_3$, and $A_4$ are H or one of $A_1$, $A_2$, $A_3$, and $A_4$ is a substituent which is a halogenyl, and the others are H; B is selected from a group consisting of S, O, N—R and C—(R)$_2$ wherein R is $C_1$-$C_6$-Alkyl; D is either an unsubstituted or a substituted $C_1$-$C_6$-alkyl; X is either H or a methoxy-group; Y is selected from a group consisting of S, O, N—R wherein R is $C_1$-$C_6$-Alkyl, and Z1-C=C—Z2, wherein Z1 and Z2 independently from each other are either H or a methoxy-group; L is either $CH_3$ or phenyl, and M is either phenyl or a substituted or unsubstituted $C_1$-$C_{18}$ amino-alkyl.

In a further embodiment, the nucleic acid dye may include a compound according to the following formula:

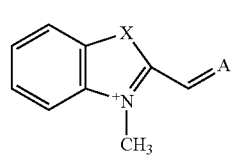

(XVIII)

wherein A is

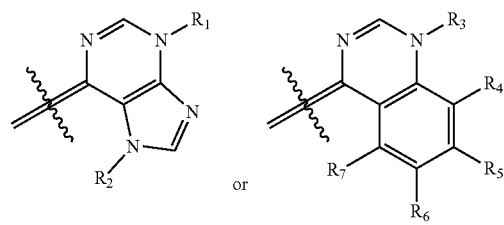

and wherein X is O or S; $R_1$, $R_2$, $R_3$, $R_4$, $R_5$, $R_6$, and $R_7$ are independently hydrogen, halogen, thiol, optionally substituted alkyl, optionally substituted alkoxy, optionally substituted alkenyl, optionally substituted polyalkenyl, optionally substituted alkynyl, optionally substituted polyalkynyl, optionally substituted thioalkyl, optionally substituted aminoalkyl, optionally substituted aryl, optionally substituted heteroaryl and optionally substituted arylalkyl; $R_1$ and/or $R_2$ carry one or more positive charges such that the sum of the positive charge(s) on $R_1$ and $R_2$ is 1, 2 or 3; and $R_3$, and/or $R_4$, and/or $R_5$, and/or $R_6$ and/or $R_7$ carry one or more positive charges such that the sum of the positive charge(s) on $R_3$, $R_4$, $R_5$, $R_6$, and $R_7$ is 1, 2 or 3.

In a further embodiment, the nucleic acid dye may include a compound according to the following formula:

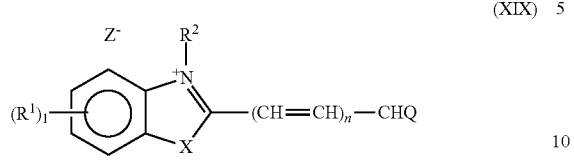
(XIX)

wherein each $R^1$ is independently H; or an alkyl group having from 1-6 carbons; or trifluoromethyl; or a halogen; or —$OR^8$, —$SR^8$ or —$(NR^8R^9)$ where $R^8$ and $R^9$, which can be the same or different, are independently H; or alkyl groups having 1-6 carbons; or 1-2 alicyclic, heteroalicyclic, aromatic or heteroaromatic rings, containing 1-4 heteroatoms, wherein the hetero atoms are O, N or S; or $R^8$ and $R^9$ taken in combination are —$(CH_2)_2$-L-$(CH_2—)_2$— where L=a single bond, —O—, —$CH_2$—, or —$NR_{10}$—, where $R^{10}$ is H or an alkyl group having 1-6 carbons; and t=1-4; $R^2$ is an alkyl group having 1-6 carbons; X is O, S, Se or —$NR^{15}$, where $R^{15}$ is H or an alkyl group having 1-6 carbons; or X is $CR^{16}R^{17}$ where $R^{16}$ and $R^{17}$, which may be the same or different, are independently alkyl groups having 1-6 carbons, or $R^{16}$ and $R^{17}$ taken in combination complete a five- or six-membered saturated ring; n=0, 1 or 2; Z is a biologically compatible counterion; Q has the formula $Q_1$ or $Q_2$:

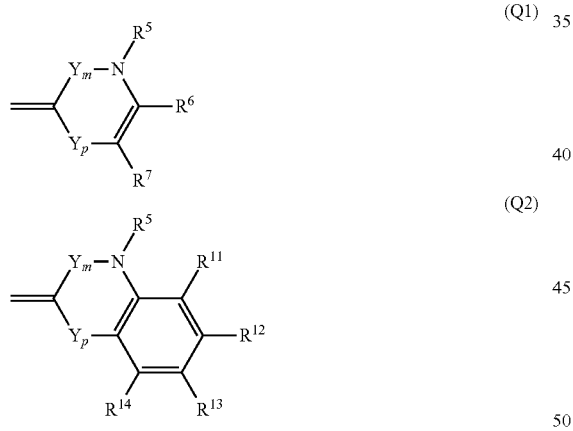
(Q1)

(Q2)

wherein Y is —$CR^3$=$CR^4$—; p and m=0 or 1, such that p+m=t; $R^5$ is an alkyl, alkenyl, polyalkenyl, alkynyl or polyalkynyl group having 1-6 carbons; or $R^5$ is Ω; $R^3$, $R^4$, $R^6$ and $R^7$, which may be the same or different, are independently H; or an alkyl, alkenyl, polyalkenyl, alkynyl or polyatlcynyl group having 1-6 carbons; or a halogen; or —OH, —$OR^8$, —$SR^8$, —$(NR^8R^9)$; or —$OSO_2R^{19}$ where $R^{19}$ is alkyl having 1-6 carbons, or perfluoroalkyl having 1-6 carbons, or aryl; or an 92; or $R^6$ and $R^7$, taken in combination are —$(CH_2)_v$— where v=3 or 4, or $R^6$ and $R^7$ form a fused aromatic ring according to formula $Q_2$; $R^{11}$, $R^{12}$, $R^{13}$, and $R^{14}$, which may be the same or different, are independently H, or an alkyl, alkenyl, polyalkenyl, alkynyl or polyalkynyl group having 1-6 carbons; or a halogen; or an Ω; or —OH, —$OR^8$, —$SR^8$, or —$(NR^8R^9)$; Ω is a cyclohexyl, cyclohexenyl, morpholino, piperidinyl, naphthyl, phenyl, thienyl, benzothiazolyl, furanyl, oxazolyl, benzoxazolyl or pyridinyl that is unsubstituted or optionally substituted one or more times, independently, by halogen, alkyl, perfluoroalkyl, areinc, alkylamino, dialkylamino, alkoxy or carboxyalkyl, having 1-6 carbons, and that is attached as $R^3$, $R^4$, $R^5$, $R^6$, $R^7$, $R^1$, $R^{12}$, $R^{13}$, or $R^{14}$ by a single bond; such that at least one of $R^3$, $R^4$, $R^5$, $R^6$, $R^7$, $R^{11}$, $R^{12}$, $R^{13}$, and $R^{14}$, is an Ω, and, where more than one of $R^3$, $R^4$, $R^5$, $R^6$, $R^7$, $R^{11}$, $R^{12}$, $R^{13}$, and $R^{14}$ is an Ω, each Ω is optionally the same or different; and such that when O has the formula $Q_1$, n=0.

In a further embodiment, the nucleic acid dye may include a compound according to the following formula:

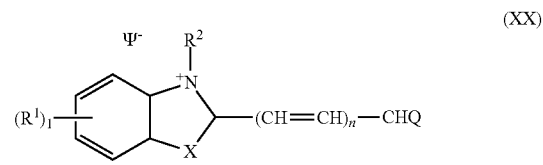
(XX)

wherein each $R^1$ is independently H; or an alkyl group having from 1-6 carbons; an alkoxy group having from 1-6 carbons; or trifluoromethyl; or a halogen; and t=1-4; $R^2$ is an alkyl group having 1-6 carbons; X is O, S, Se or $NR^{15}$, where $R^{15}$ is H or an alkyl group having 1-6 carbons; or X is $CR^{16}R^{17}$ where $R^{16}$ and $R^{17}$, which may be the same or different, are independently alkyl groups having 1-6 carbons, or $R^{16}$ and $R^{17}$ taken in combination complete a five or six-membered saturated ring; n=0, 1 or 2; Ψ⁻ is a biologically compatible counterion; Q has the formula Q1 or Q2

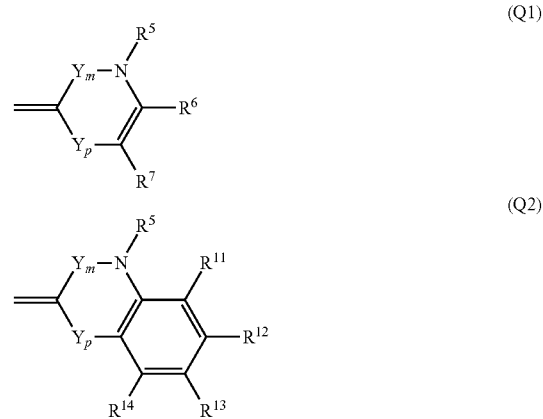
(Q1)

(Q2)

wherein Y is —$CR^3$=$CR^4$—; p and m=0 or 1, such that p+m=1; $R^5$ is an alkyl, alkenyl polyalkenyl, alkynyl, or polyalkynyl group having 1-6 carbons; or $R^5$ is a cyclic substituent that is a substituted or unsubstituted aryl or heteroaryl; or a substituted or unsubstituted cycloalkyl having 3-10 carbons; or $R^5$ is a TAIL; $R^3$, $R^4$, $R^6$, and $R^7$, which may be the same or different, are independently H; or an alkyl, alkenyl. polyalkenyl, alkynyl or polyalkynyl group having 1-6 carbons; or a halogen; or a substituted or unsubstituted aryl or heteroaryl; or a substituted or unsubstituted cycloalkyl having 3-10 carbons; or —$OR^8$, —$SR^8$, —$(NR^8R^9)$; or —OSO₂R¹⁹; or a TAIL; where $R^8$ and $R^9$, which can be the same or different, are independently H; or alkyl groups having 1-6 carbons; or 1-2 alicyclic or aromatic rings; or $R^8$ and $R^9$ taken in combination are —(CH₂)₄— or —(CH₂)₅— to give a 5 or 6 membered ring; and where $R^{19}$ is alkyl having 1-6 carbons, or perfluoroalkyl having 1-6 carbons, or aryl; or $R^6$ and $R^7$, taken in combination are —(CH₂)ᵥ— where v=3 or 4, or $R^6$ and $R^7$ form a fused aromatic ring according to formula Q2; $R^{11}$, $R^{12}$, $R^{13}$, and $R^{14}$, which may be the same or different, are independently H; or an alkyl, alkenyl, polyalkenyl, alkynyl or polyalkynyl group having 1-6 carbons; or a halogen; or a TAIL; or —OH, —OR⁸, —SR⁸, or —(NR⁸R⁹); TAIL is a heteroatom-containing moiety having the formula LINK-SPACER-CAP; wherein LINK is a single covalent bond, —O—, —S—, or —NR²⁰—; where $R^{20}$ is H, a linear or branched alkyl having 1-8 carbons, or $R^{20}$ is -SPACER'-CAP'; SPACER and SPACER', which may be the same or different, are covalent linkages, linear or branched, cyclic or heterocyclic, saturated or unsaturated, each having 1-16 nonhydrogen atoms selected from the group consisting of C, N, P, O and S, such that the linkage contains any combination of ether, thio-ether, amine, ester, amide bonds; or single, double, triple or aromatic carbon-carbon bonds; or phosphorus-oxygen, phosphorus-sulfur bonds, nitrogen-nitrogen or nitrogen-oxygen bonds; or aromatic or heteroaromatic bonds; CAP and CAP', which may be the same or different, are —O—R²¹, —S—R²¹, —NR²¹R²², or —N⁺R²¹R²²R²³ Ψ⁻; wherein $R^{21}$, $R^{22}$, and $R^{23}$ are independently H, or a linear or branched alkyl or cycloalkyl having 1-8 carbons, optionally further substituted by hydroxy, alkoxy having 1-8 carbons, carboxyalkyl having 1-8 carbons, or phenyl, where phenyl is optionally further substituted by halogen, hydroxy, alkoxy having 1-8 carbons, aminoalkyl having 1-8 carbons, or carboxyalkyl having 1-8 carbons; or, one or more of $R^{21}$, $R^{22}$ and $R^{23}$, taken in combination with SPACER or SPACER' or $R^{20}$ forms a 5- or 6-membered aromatic, heteroaromatic, alicyclic or heteroalicyclic ring, the heteroatoms selected from O, N or S; where Ψ⁻ is a biologically compatible counterion; or CAP and CAP' are independently

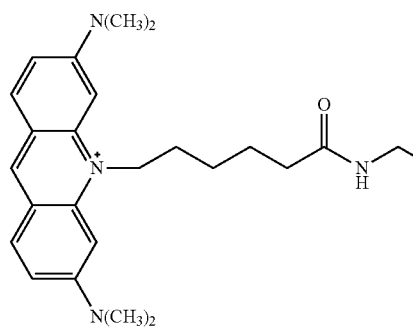

wherein $R^{21}$, $R^{22}$, and Ψ⁻ are as defined previously; such that at least one of $R^3$, $R^4$, $R^5$, $R^6$, $R^7$, $R^{11}$, $R^{12}$, $R^{13}$, and $R^{14}$ is a TAIL; and when $R^5$ is a TAIL, LINK is a single bond; and where only $R^5$ is a TAIL, $R^3$ or $R^4$ is not hydrogen; and, where more than one of $R^2$, $R^3$, $R^4$, $R^5$, $R^6$, $R^7$, $R^{11}$, $R^{12}$, $R^{13}$, and $R^{14}$ is a TAIL, each TAIL is optionally the same or different.

In a preferred embodiment, the dye is comprised of two homopolymers linked by a bridge [X]. In a still further preferred embodiment, the dye is a compound according to the formula:

The one or more nucleic acid dyes may be present in an amount of about 1× (1.25 µM) to about 20× (25 µM), preferably between about 1× (1.25 µM) to about 12× (15 µM), inclusive of all integers within these ranges.

Portable Histone Assay Technology (PHAST)

The present disclosure relates to portable histone assay technology to assess the risk of multiple organ failure. Whole blood presents challenges for point-of-care assays. The high cellular content can clog microfluidic devices and lateral flow immunoassays. In addition, the red blood cells absorb and scatter light, making fluorescence and colorimetric measurements impossible. As a result, assays often use plasma as the sample, but this requires sample processing that is not compatible with rapid point-of-care testing.

Beneficially, the presently disclosed assays avoid clogging by the use of small testing containers such as cuvettes or millimeter-scale channels. Moreover, the present disclosure beneficially eliminates the problem of optical scattering and absorbance by automatically removing the blood cells from solution before measurements are performed through the use of a red blood cell aggregator, which quickly clears the solution prior to fluorescence measurements to detect histones.

The assays described herein may be provided in the form of a solid, a liquid, or a combination thereof. In other words, the sacrificial partition is preferably a solid at room temperature and one or more of the reagents can be lyophilized (i.e., a powder) or other solid. Alternatively, one or more of the reagents can be liquid at room temperature. For example, the sacrificial partitions are preferably solid at room temperature but have a low melting point, permitting the partitions to become liquid upon application of low heat. The reagents sequestered between the sacrificial partitions may be provided as solids (including a solid layer, a powder layer, or a gel layer) or as liquids. The melting point of a given material comprising a sacrificial partition may be modified through the addition of a solidifying agent or an encapsulant, such as carbon black, carboxymethyl cellulose, or a combination thereof.

PHAST with a Single Partition

Figure 8:
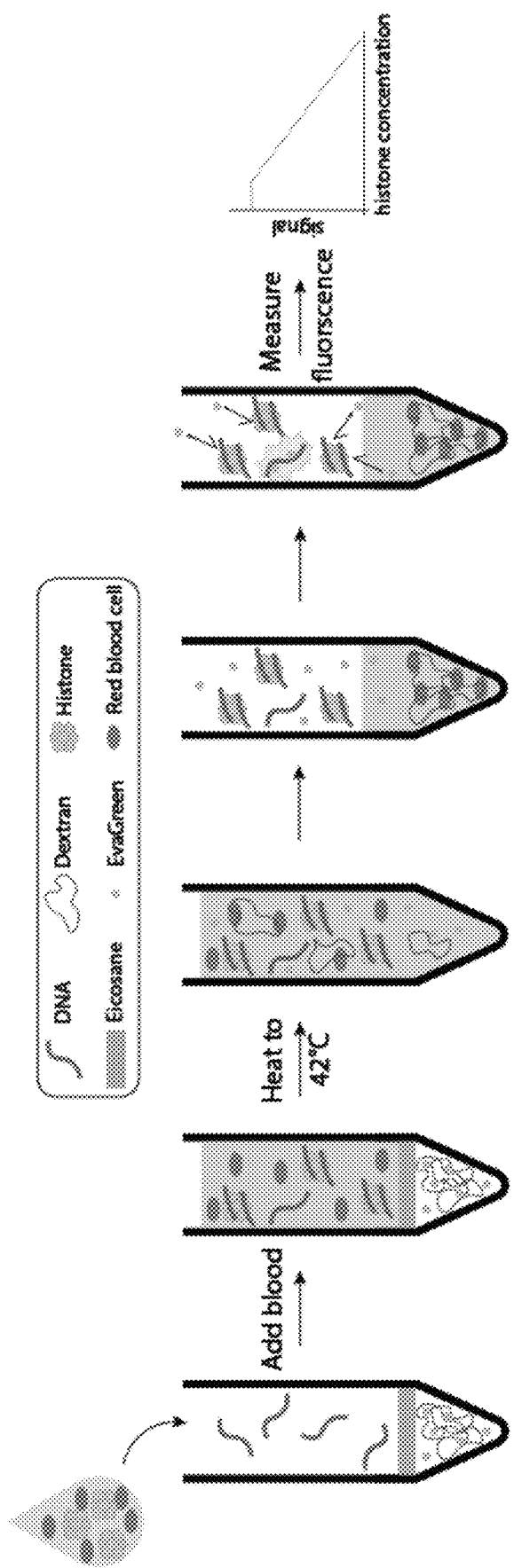
FIG. 8 shows another embodiment of methods and assays for the quantification of histone octamers in a whole blood sample using an assay tube. In this Figure, the assay tube contains red blood cell aggregator dextran and the dye EvaGreen sequestered under hardened eicosane, a higher-order alkane. DNA is located above the hardened eicosane, initially separated from the EvaGreen. As the blood sample is added to the tube, the DNA wraps around any histones present in the sample. As the tube is heated, the wax melts, releasing the dextran and EvaGreen. As dextran rapidly aggregates red blood cells, EvaGreen intercalates with any free DNA. When DNA is wrapped around histones, EvaGreen is unable to intercalate. Thus, as histone concentration increases, overall fluorescence decreases.

In an embodiment of the PHAST design, a container such as a plastic disposable chip (PHAST chip), cartridge, or sample test tube/cuvette contains all reagents for the assay. According to this embodiment, shown in FIG. 8, a detectable label such as a dye and a red blood cell aggregator are sequestered at the base of the sample container below a sacrificial partition preferably comprising a higher-order alkane. On top of the sacrificial partition, a target molecule, such as histone-binding DNA is positioned. The whole blood sample is combined with the target molecule. After a brief incubation period, the sacrificial partition melts, permitting the mixing of the previously separated reagents. Where the sacrificial partition is comprised of a higher-order alkane, because the liquefied alkane has a lower density than water, and because the alkane is attracted to the sample container side wall (and repelled by water), it parts in the center of the barrier as it migrates to the container side wall leading to the mixing of previously separated reagents. The red blood cell aggregator clears the blood cells while the detectable label binds to a target, e.g., any DNA that is not bound to histones in the blood sample. After a brief reaction time, the PHAST instrument described herein records the fluorescence intensity, enabling the quantification of an analyte either directly or indirectly (e.g., histones in the blood sample). No precise measurements or manual steps are required to perform the test.

PHAST with Two Partitions

Figure 7:
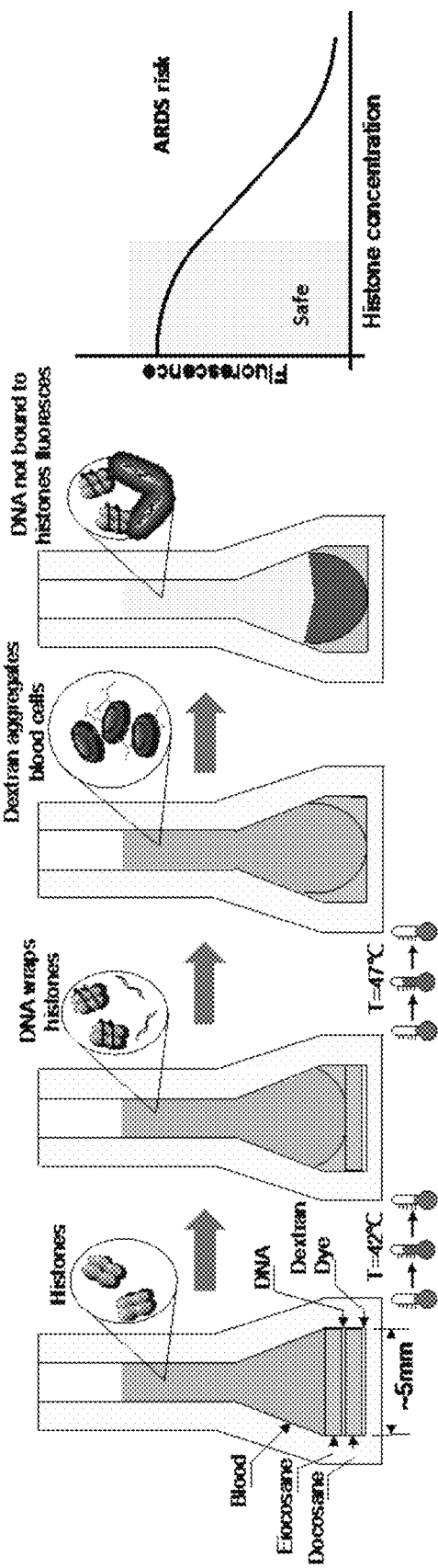
FIG. 7 shows an embodiment of circulating histone detection with PHAST wherein histone-binding DNA, dextran, and an intercalating dye are stored lyophilized under sacrificial partitions. The bottom of the PHAST chip/cartridge is temporarily heated to the respective melt temperature to automatically release the reagents (e.g., eicosane Tm=42° C., docosane Tm=47° C.). Upon release, DNA binds histones in the blood sample. Upon release, dextran aggregates red blood cells, causing them to sink. An intercalating dye can only bind free DNA, resulting in an inverse relationship between histone levels and fluorescence. The assay is completed within 30 minutes.

In an embodiment of the PHAST design, a container such as a plastic disposable chip or a cartridge contains all reagents for the assay. According to this embodiment, shown in FIG. 7, a detectable label such as a dye and a red blood cell aggregator are sequestered (preferably in a lyophilized form) at the base of the sample container below a first sacrificial partition preferably comprising a higher-order alkane. On top of the first sacrificial partition, a target molecule, such as histone-binding DNA is sequestered (preferably in lyophilized form) underneath a second sacrificial partition comprised of a higher-order alkane. The whole blood sample is added to the container on top of the second sacrificial partition.

The first sacrificial partition and the second sacrificial partition may be comprised of the same material or different materials. In an embodiment, the first sacrificial partition and the second sacrificial partition are both comprised of the same higher-order alkane. In another embodiment, the first sacrificial partition and the second sacrificial partition are comprised of different higher-order alkanes, wherein one sacrificial partition has a melt temperature slightly higher than the other sacrificial partition. For example, the first sacrificial partition may be comprised of docosane, which has a melt temperature of 47° C., while the second sacrificial partition may be comprised of eicosane, which has a melt temperature of 42° C.

After the blood sample is added to the chip/cartridge, the chip/cartridge is placed into the handheld PHAST instrument containing a heating element and optics for the fluorescence measurement. After a brief incubation period, the first sacrificial partition melts, permitting the mixing of the previously separated reagents. After a further incubation period, preferably at a higher temperature, the second sacrificial partition melts, allowing further mixing of previously separated reagents. The red blood cell aggregator clears the blood cells while the detectable label binds to a target, e.g., any DNA that is not bound to histones in the blood sample. After a brief reaction time, the PHAST instrument described herein records the fluorescence intensity, enabling the quantification of an analyte either directly or indirectly (e.g., histones in the blood sample). No precise measurements or manual steps are required to perform the test. The chip/cartridge is easily produced at scale, and the reagents are inexpensive and can be easily deposited and lyophilized during the manufacturing process. As a result, the disposable chip/cartridge is more cost-effective than other tests, such as lateral flow assays.

PHAST with a Plurality of Partitions

In an embodiment, a plurality of sacrificial partitions, particularly those that are thermally reversible, are used to sequester multiple assay reagents. The sacrificial partitions preferably comprise ordinarily solid-purified hydrocarbon waxes that exhibit sharply defined melting transitions at distinct temperatures. Reagents for each step of a multipart reaction remain isolated from one another until the respective barrier is melted, at which point the sacrificial partition either mixes with the reagents or migrates to the sides of the container, permitting the mixing of the reagents sequentially. This approach allows arbitrarily long reaction stages and at least five distinct reagent zones within a single container, such as a channel or a 200 µL test tube.

Figure 9:
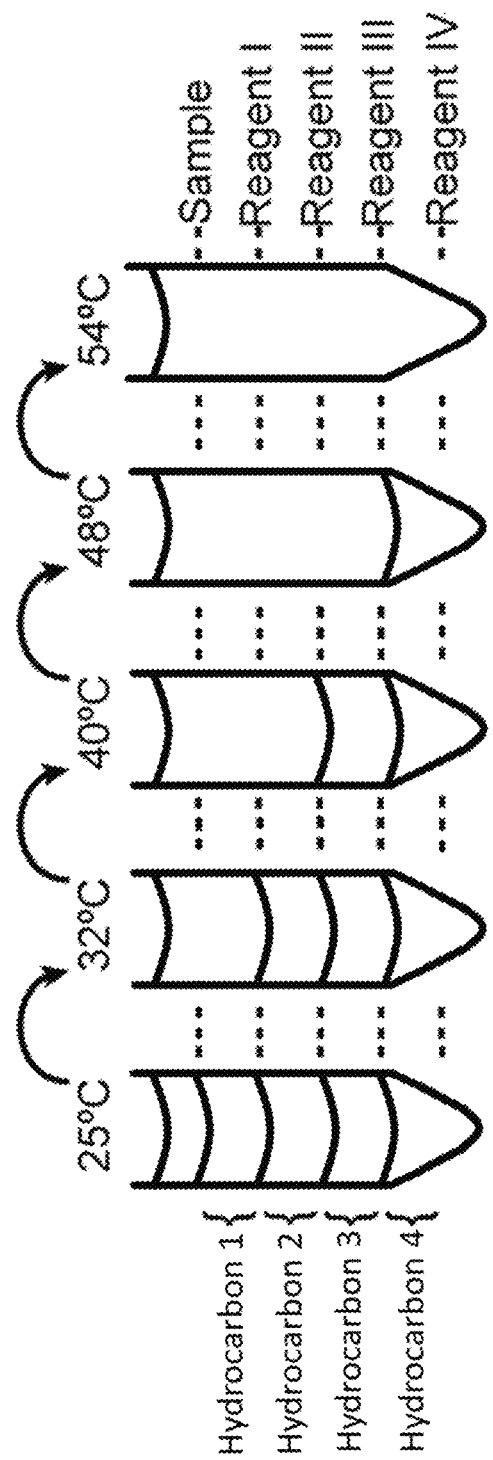
FIG. 9 shows an example of PHAST sample tube(s) with multiple sacrificial partitions. Specifically, multiple hydrocarbon sacrificial partitions were used to separate a series of reagents. The sample tube was heated to a first temperature, at which point the first sacrificial partition liquified. The sample tube was then heated to a second temperature, at which point the second sacrificial partition liquified, and so forth, thus serially adding reagents to the reaction.

The sacrificial partitions may be comprised of the same material, e.g., eicosane. To facilitate the serial removal of individual sacrificial partitions, the plurality of sacrificial partitions are comprised of different materials. In an embodiment, to further stabilize the sacrificial partitions and support serial removal, the sacrificial partition may further comprise an encapsulant. In a preferred embodiment, the encapsulant is carbon black (CB), carboxymethyl cellulose (CMC), or a combination thereof. Further discussion of sequential removal of sacrificial partitions, encapsulation of the same, and sacrificial partitions more generally is found in Goertz et al., *Multistage Chemical Heating for Instrument-Free Biosensing*, ACS Appl. Mater. Interfaces 10 (2018), 33043-33048, Goetz & White, *Phase-Change Partitions for Thermal Automation of Multistep Reactions*, Anal. Chem. 90 (2018), 3708-3713, and Everitt et al., *Sample-to-Answer Diagnostic System for the Detection of Circulating Histones in Whole Blood*, doi.org/10.1021/acssensors.1c00886, which are herein incorporated by reference in their entirety. An example embodiment comprising a plurality of sacrificial partitions is shown in FIG. 9.

Additional Ingredients

In addition to the aforementioned components, the assay compositions may further include one or more optional additional ingredients, such as a singlet oxygen quencher, a preservative/stabilizer, a buffering agent, an excipient, a bulking agent, a dispersing agent, a solubilizer, a solvent, a solidification agent, or any combination thereof.

A singlet oxygen quencher is a compound capable of inhibiting undesirable contact between the raw sample (and components therein) and various contaminants or potential sources of degradation. Singlet oxygen quenchers can in particular protect against the effects of oxygen. Examples of suitable singlet oxygen quenchers include, but are not limited to, alkyl imidazoles (e.g., histidine, L-carnosine, histamine, imidazole 4-acetic acid), indoles (e.g., tryptophan and derivatives thereof, such as N-acetyl-5-methoxytryptamine, N-acetylserotonin, 6-methoxy-1,2,3,4-tetrahydro-beta-carboline), sulfur-containing amino acids (e.g., methionine, ethionine, djenkolic acid, lanthionine, N-formyl methionine, felinine, S-allyl cysteine, L-selenocysteine, S-[2-(4-pyridyl)ethyl]-L-cysteine, S-diphenylmethyl-L-cysteine, S-trityl-homocysteine, L-cysteine, N-acetyl-cysteine, S-ally-L-cysteine sulfoxide, S-aminoethyl-L-cysteine), phenolic compounds (e.g., tyrosine and derivatives thereof), aromatic acids (e.g., ascorbate, salicylic acid, and derivatives thereof), azides such as sodium azide, tocopherol, and related vitamin E derivatives, and carotene and related vitamin A derivatives.

A preservative/stabilizer is any compound that inhibits the growth of microorganisms and/or prolongs the storage or stability of a raw sample or the components of the assay. Examples of suitable preservatives include, but are not limited to, sodium fluoride, citrate, dextrose, ACD, CPD, CPDA-1, sodium azide, a polyethylene glycol such as polyethylene glycol 200 (PEG 200), polyethylene glycol 300 (PEG 300), polyethylene glycol 400 (PEG 400), polyethylene glycol 540 (PEG 540), polyethylene glycol 600 (PEG 600), polyethylene glycol 1000 (PEG 1000), polyethylene glycol 1450 (PEG 1450), polyethylene glycol 3350 (PEG 3350), polyethylene glycol 4000 (PEG 4000), polyethylene glycol 4600 (PEG 4600), polyethylene glycol 8000 (PEG 8000), Carbowax MPEG 350, Carbowax MPEG 550, Carbowax MPEG 750, or a combination thereof. In some embodiments, the assay compositions include a preservative that preserves the activity of molecules that are dried (e.g., lyophilized), such as a sugar. Examples of suitable sugars include sucrose, fructose, trehalose, or a combination thereof.

Buffers may be used to modify or maintain the pH of the assays. Examples of suitable pH buffers include, without limitation, pH buffers include citric acid, tartaric acid, malic acid, sulfosalicylic acid, sulfoisophthalic acid, oxalic acid, borate, CAPS (3-(cyclohexylamino)-1-propanesulfonic acid), CAPSO (3-(cyclohexylamino)-2-hydroxy-1-propanesulfonic acid), EPPS (4-(2-hydroxyethyl)-1-piperazinepropanesulfonic acid), HEPES (4-(2-hydroxyethyl)piperazine-1-ethanesulfonic acid), MES (2-(N-morpholino)ethanesulfonic acid), MOPS (3-(N-morpholino)propanesulfonic acid), MOPSO (3-morpholino-2-hydroxypropanesulfonic acid), PIPES (1,4-piperazinediethanesulfonic acid), TAPS (N[tris(hydroxymethyl)methyl]-3-aminopropanesulfonic acid), TAPSO (2-hydroxy-3-[tris(hydroxymethyl)methylamino]-1-propanesulfonic acid), TES (N-[tris(hydroxymethyl)methyl]-2-aminoethanesulfonic acid), bicine (N,N-bis(2-hydroxyethyl)glyrine), tricine (N-[tris(hydroxymethyl)methyl] glycine), tris (tris(hydroxymethyl)aminomethane), bis-tris (2-[bis(2-hydroxyethyl)amino]-2-(hydroxymethyl)-1,3-propanediol), 5-(4-dimethyl)amino benzylidene rhodanine, sulfosalicylic acid, lithium chloride, and lithium hydroxide, lithium dodecyl sulfate, or a combination thereof.

One or more solidification agents may be used to solidify one or more layers of the assay compositions. Examples of suitable solidification agents include, but are not limited to, carbon black, carboxymethyl cellulose, or a combination thereof.

The assay compositions optionally include one or more solvents. Suitable solvents preferably include organic solvents and solvents compatible with whole blood samples. Examples of solvents include, but are not limited to, water, acetonitrile, acetone, methanol, ethanol, or a combination thereof.

Raw Sample Material

The raw sample or sample material used in conjunction with the assays described herein will generally be a sample collected directly from a patient which contains one or more analytes/biomarkers to be identified and/or quantified. The sample material will generally contain wholly or a high quantity of intact cells, i.e. cells that have not yet been intentionally lysed. Although some cells in a raw sample may be ruptured due to natural causes or the state of the sample upon collection, a raw sample according to the present application does not contain cells intentionally ruptured, or otherwise processed or prepared.

The source of the raw sample may comprise, without limitation, a biological fluid, a biological suspension, a fluid aspirate, blood, plasma, serum, lymph, cerebrospinal fluid, gastric fluid, bile, perspiration, ocular fluid, tears, oral fluid, sputum, saliva, a buccal sample, a tonsil sample, a nasal sample, mucus, a nasopharyngeal sample, semen, urine, a vaginal sample, a cervical sample, a rectal sample, a fecal sample, a wound or purulent sample, hair, a tissue, a tissue homogenate, cells, a cellular lysate, a tissue or cell biopsy, skin cells, tumor or cancer cells, a microbe, a pathogen, a bacterium, a fungus, a protozoan or a virus, or any combination thereof. Preferably the raw sample comprises whole blood.

Sample Reader

The present disclosure further relates to a portable sample reader capable of detecting the presence of and quantifying the concentration of, an analyte. Beneficially, the sample reader is portable and can be used in combination with the assays described herein to provide results rapidly and without multiple manual processing steps. The sample reader comprises one or more of a housing unit comprising a reader housing unit, an imager housing unit, an imager cover, and a reader lid; and an optical system comprising a light source, a filter, and one or more of a photosensor, a detector, and an imager. The sample reader may optionally further comprise a sample holder, a cooling element, a heating element, memory storage, a readout interface, a bar code reading system, a power source, and one or more algorithms for sample analysis and quality checks.

Sample Holder

The sample reader may include a sample holder configured to receive one or more sample containers. The sample holder may have one or more of sample regions, channels, or wells, configured for receiving a plurality of sample containers. Some examples of a sample holder may include, but are not limited to, a multi-well plate, card, or array, including but not limited to a 24- to 384-well microtiter plate, a microcard, a through-hole array, a test tube rack (i.e., holes with an opening sufficiently narrow to permit the bottom of a test tube to pass through the opening but not the top or lip of the test tube), or other holder capable of receiving a sample. The wells in various embodiments of a sample holder may include depressions, indentations, ridges, and combinations thereof, patterned in regular or irregular arrays formed on the surface of the sample holder substrate. Sample or reaction volumes can also be located within wells or indentations formed in a substrate, spots of solution distributed on the surface of a substrate, or other types of reaction chambers or formats, such as samples or solutions located within test sites or volumes of a microfluidic system, or within or on small beads or spheres.

Heating and Cooling Elements

The sample reader may also include one or more of a heating element, a cooling element, or a combination thereof. In an embodiment, the elements for heating or cooling can be a thermoelectric device. The number of thermoelectric devices used within a thermal block assembly can depend on a number of factors including, but not limited to, cost, the number of independent zones desired, and the size of the sample holder. Moreover, if control over multiple zones on a sample block is desired, the number of thermoelectric devices can vary from a single thermoelectric device to, for example, a thermoelectric device per sample region (e.g., well, through-hole, reaction site, etc.). In an embodiment, the heating element is a heating coil. In a preferred embodiment, the heating coil operates via a battery or other wireless power source.

In an alternative embodiment, the sample reader operates without requiring electricity. For example, the heating element may be comprised of an electricity-free heater based on exothermic chemical reactions and engineered phase change materials as described in LaBarre et al., *A Simple, Inexpensive Device for Nucleic Acid Amplification Without Electricity—Toward Instrument-Free Molecular Diagnostics in Low-Resource Settings*, PLoS One 2011, 6, No. e19738 or in Curtis, et al., *Isothermal Amplification Using a Chemical Heating Device for Point-of-Care Detection of HIV-1*, PLoS One 2012, 7, No. e31432 both of which are herein incorporated by reference in their entirety.

Optical System

The sample reader may include an optical system comprising one or more of a light source, a filter, an optical sensor, a detector, or an imager. In some embodiments, the light source is a light-emitting diode (LED) device. The light source may also include an integrated lens for the collimation of LED-emitted light. In some embodiments, the optical system includes multiple light sources, for example, LEDs with various central emission wavelengths, with matched optical filters.

In some embodiments, the optical system includes one or more filters. For example, the optical filter can be a bandpass, long-pass, or short-pass optical filter. The optical filter may operate by interference or by absorption. An optical filter is preferably capable of tuning or modulating optical excitation wavelengths experienced by a sample during sample analysis. For example, an optical filter passes wavelengths associated with the photoluminescent label emission of a given sample, while blocking wavelengths associated with optical excitation. Additionally, or alternatively, an optical collection filter may be mechanically actuated. In an embodiment, the filter is a long-pass filter capable of separating a broad spectrum of light into two components: a transmitted component and a rejected component. In some embodiments, the sample reader may comprise one or more independent sample tubes, lines, channels, chambers, or containers for analyzing a plurality of samples. Electronic frequency filtering may be used to filter signals from one or more sensors. In certain embodiments, coordinating pairs of light sources and sensors are configured so that different channels, lines, or chambers are interrogated at different points in time.

The sample reader may also comprise one or more of an optical sensor, such as a photosensor, detector, or imager. Generally, a photosensor is a device that transduces optical energy directed at the surface of the sensor into an electrically registered signal. Photosensors are selected to be responsive to one or more desired optical emission wavelengths. Suitable photosensors include, without limitation, a photosensor chip, a photosensor cartridge, photodiode, phototransistor, photo-resistor, charge-coupled device, or photon multiplier tube. A detector includes any device that detects and measures a particular substance and emits a signal in response. Examples of detectors include but are not limited to, a thermal infrared detector, a photonic detector (photodetector), a near-infrared (NIR) sensor card, or a biodetector/biosensor. An imager includes any device capable of detecting and capturing a particular substance in the form of an image. Examples of suitable imagers include, but are not limited to, a digital camera such as a compact, bridge, DSLR or mirrorless camera, a film camera, a high-resolution microscopy camera, a Complementary Metal Oxide Semiconductor camera (CMOS-chip camera), an sCMOS-chip camera, a charge-coupled device camera (CCD-chip camera), a smartphone or phone camera, a USB camera, such as a general-purpose USB camera controller board capable of accommodating various CMOS camera modules (e.g., an ArduCAM), or a combination thereof.

Algorithms for Sample Analysis, Sample Reader Operation, and Quality Checks

In some embodiments, the sample reader uses one or more algorithms to enact sample analysis, to effect sample reader conditions/parameters, and/or to perform quality checks, including calibration. With respect to sample analysis, in an embodiment, the sample reader comprises an algorithm to characterize the presence or amount of an analyte according to assay-specific calibration parameters. An algorithm provides either a quantitative, semi-quantitative, or qualitative estimate of the analyte concentration within the fluid sample. More particularly, the algorithm can provide an estimate of the analyte either directly or indirectly. For example, where the degree of fluorescence is inversely proportional to the concentration of histones, the algorithm may calculate the degree of fluorescence and provide an estimate of the histone concentration. Still more particularly, the sample reader measures fluorescence intensity, and the intensity level is translated into a concentration of histones either by using a microcontroller or by sending the intensity to an external readout device (for example, a tablet, phone, computer) that translates the signal intensity into a histone concentration using calibration data. Alternatively, the external readout device or microcontroller compares the intensity to a pre-programmed/pre-determined threshold to determine if the histone levels are above or below a pre-determined threshold associated with a certain risk level, for example, a risk of multiple organ dysfunction.

For example, in some embodiments, after the relevant detection threshold is set, the algorithm carries out one or more of the following steps: (1) taking an image (preferably a fluorescence image) of a control container comprising a detectable label, a sample container, or a combination thereof; (2) identifying containers comprising the detectable label; (3) measuring the detectable label in the sample container, in the control container, or a combination thereof (e.g., the intensity of fluorescence from a dye); (4) reporting the concentration of the detectable label in the containers that were measured; and optionally (5) normalizing the concentration value for the sample container with the concentration value for the control container.

The measurement of the detectable label can occur in all or in a representative portion of the sample container. In an embodiment, the detectable label is nucleic acid dye fluorescence, the image taken is a fluorescence image such as a photo, and the measurement of the detectable label is a measurement of the grayscale pixel value. In an embodiment, a reverse sigmoidal curve fit (e.g., in MATLAB) is used to model a curve for detectable label measurements (e.g., histone levels), permitting the conversion between the fluorescent image and a numerical value for fluorescence intensity.

With respect to quality checks, in some embodiments, the algorithm or other part of the sample reader is capable of providing one or more quality control checks. Quality control checks may include but are not limited to, a quality control check of scan data, a check of sample container presence and clearance, and checks as to the calculated estimates of the analyte. For example, the sample reader may include a processing algorithm for the verification of sample responses. The algorithm may analyze the response of one or more sample containers run with control liquids of specified concentrations. The algorithm then compares the expected responses with those found from the sample containers and verifies the sample containers as operating to a given specification. Further, the algorithm may also conduct optimization and correction of sample container calibration parameters. For example, following the analysis of one or more sample containers run with control liquids of specified concentrations, internal calibration parameters may be updated to provide a best-fit result to control responses.

A global modeling algorithm can function in a dye calibration to derive a model of dye calibration factors for each filter for each dye based on the measured dye calibration factors of the specific dye presented-wells. For example, if 24 wells are presented on the 96-well checkerboard plate for a specific dye, global modeling utilizes the dye calibration factors of those 24 wells to derive calibration factors for all the wells including the other 72 wells and thus produces a model for the whole plate per channel, per dye.

Regarding sample reader operation and control, in some embodiments, the sample reader comprises one or more algorithms to effect or modify sample reader parameters or conditions. The sample reader may comprise an algorithm for precise temperature control over a given period of time; the type of light source used during sample analysis; the intensity at which the light source is used, the length of time a sample is exposed to a light source, or a combination thereof. In an embodiment where the sample reader uses an algorithm to determine temperature over a given period of time, the algorithm enables the sample reader (specifically a heating element) to heat to a first threshold temperature, melting a first sacrificial partition. Subsequently, the algorithm may enable the sample reader to heat to a second threshold temperature, melting a second sacrificial partition, and so forth.

The one or more algorithms may be part of a system for predicting the risk of multiple organ failure comprising: one or more algorithms as described herein (such as an algorithm to enact sample analysis) stored on a non-transitory computer-readable medium capable of receiving one or more inputs; wherein the algorithm carries out one or more of the following steps: (1) taking an image (preferably a fluorescence image) of a control container comprising a detectable label, a sample container, or a combination thereof; (2) identifying containers comprising the detectable label; (3) measuring the detectable label in the sample container, in the control container, or a combination thereof (e.g., the intensity of fluorescence from a dye); (4) reporting the concentration of the detectable label in the containers that were measured; and optionally (5) normalizing the concentration value for the sample container with the concentration value for the control container.

Memory Storage

In some embodiments, the sample reader includes electronic memory and a digital file management system for the storage of data, operation parameters, software, and user interface details. The electronic memory storage system may comprise a memory chip, such as RAM, ROM, CMOS, flash, or a combination thereof. Files stored within this electronic memory may include, for example, scan files, calibration files, quality control run files, user lists, settings and change logs, scan logs, calibration run logs, or user logs. In order to review a potentially large number of scan files, search functionality may be implemented. This search functionality generally consists of user interface options enabling the user to filter scan results by date, operator, patient ID, or test.

Readout Interface for Test Results

In some embodiments, the sample reader includes one or more readout interfaces for reading the test results issued by the sample reader. The mechanism for reading test results can include a printer for the printout of hard copies of test results or an electronic readout. The printer may be incorporated as part of the sample reader or provided as a separate component. In the case of the printer being a separate component, the printer may be interfaced with the reader using a USB, Ethernet, serial port connection, or a wireless connection. An electronic readout of the test results may be presented on an independent device, such as a computer monitor, a smartphone, a tablet, or a combination thereof. Alternatively, or additionally, the electronic readout of the test results may be presented on a user interface of the sample reader.

Relatedly, the sample reader optionally includes components and protocols for external wireless access, such as Wi-Fi, ANT, or Bluetooth. In an embodiment, this connectivity enables remote reader operation diagnostics, firmware or software updates, and data transfer. Alternatively, or in addition to wireless capabilities, the sample reader may include components and protocols for wired connectivity, such as RS-232 serial, universal serial bus (USB), or Ethernet cable.

Power Source

The sample reader may optionally include a power source. The power source may comprise an internal battery that supplies the reader with electrical power. Alternatively, the sample reader may include a wired connection to a main power supply, e.g., via an outlet. The sample reader may be provided with a power cord so that it can accept AC power from a main supply or generator. When the reader is configured to operate by using one or more batteries, it may also be equipped with a battery recharging system and various warning devices that alert a user if battery power is becoming too low to reliably initiate or complete diagnostic analysis. In a preferred embodiment, however, the sample reader does not require electricity to operate.

Other Sample Reader Components

The sample reader may optionally further comprise any number of additional components or parts, including hardware or software, to enable sample analysis. For example, the sample reader optionally comprises one or more sensors, a controller, a microcontroller, a control panel, a pH monitor, one or more ports, or the like, or a combination thereof.

Sample Container

The sample reader is preferably configured to receive one or more sample containers. The one or more sample containers preferably comprise the assay compositions described herein and are configured to receive a sample such as whole blood. The one or more sample containers are preferably placed into or onto the sample holder of the sample reader. When contacted with a sample such as whole blood, the assay in the sample container undergoes a reaction enabling the sample reader to detect an analyte. Examples of a suitable sample container include but are not limited to, a capillary, chamber, reservoir, cuvette, microfuge tube, test tube, a planar container (e.g., a plastic slide, paper), a microfluidic channel, microcentrifuge tube, conical centrifuge tube, or other container.

Bar Code Reading System

In some embodiments, the sample reader includes a barcode reading system. A barcode may be encoded on one or more sample containers. The barcode may be encoded with assay-specific calibration data relating to a given batch of sample containers. Upon introduction of the sample container to the reader system, the assay-specific calibration data may be read, interpreted, and copied to an internal reader memory. For example, when present, the barcode reading system may be one-dimensional or two-dimensional. Examples of information that can be encoded in the barcode reading system include, but are not limited to, identification of sample container type or lot data, lot manufacture and expiry dates, analyte names, sample expected response, lot parameters, calibration parameters, or a combination thereof.

Housing Unit

The sample reader may further include one or more housing units that protect the reader against water, dust, tampering, or unintended user interference. The housing unit may comprise one or more materials configured to encompass (in whole or part) one or more components of the sample reader and one or more lids for covering one or more apertures in the sample reader. The housing unit may be comprised of any suitable light and sturdy material, including but not limited to a plastic such as polyastic acid (PLA), acrylonitrile butadiene styrene (ABS), polyvinyl alcohol plastic (PVA), or polycarbonate (PC), a powder such as polyamide (nylon) or alumide, a resin such as a high-detail resin, a paintable resin, or a transparent resin, a metal such as stainless steel, nickel, aluminum, titanium or an alloy such as nitinol, magnesium fluoride ($MgF_2$) carbon fiber, graphine, graphene, or a combination thereof.

In an embodiment wherein the imager e.g., the camera, is provided as a separate component, the housing covers the entire sample reader except for the imager. In an alternative embodiment, a first housing unit is provided to cover the sample container(s), heating coil, light source, and light source; and a second housing unit is provided to cover the camera, photosensor, or optical system.

Further discussion of sample reader systems is found in U.S. Pub. No. 2014/0154792 which is herein incorporated by reference in its entirety.

Example Sample Readers

Turning now to the Figures, FIG. 1 provides an example embodiment of a sample reader 100 according to the present disclosure. The sample reader 100 comprises a light source 102, preferably an LED light, a filter 104, preferably a longpass filter, an imager 106, preferably a camera, a heating element 108, and reader housing comprising a reader housing unit 110, imager housing 112, an imager cover 114, and a reader lid 116. The sample reader 100 is configured to receive a sample container 118, such as a test tube.

Figure 2:
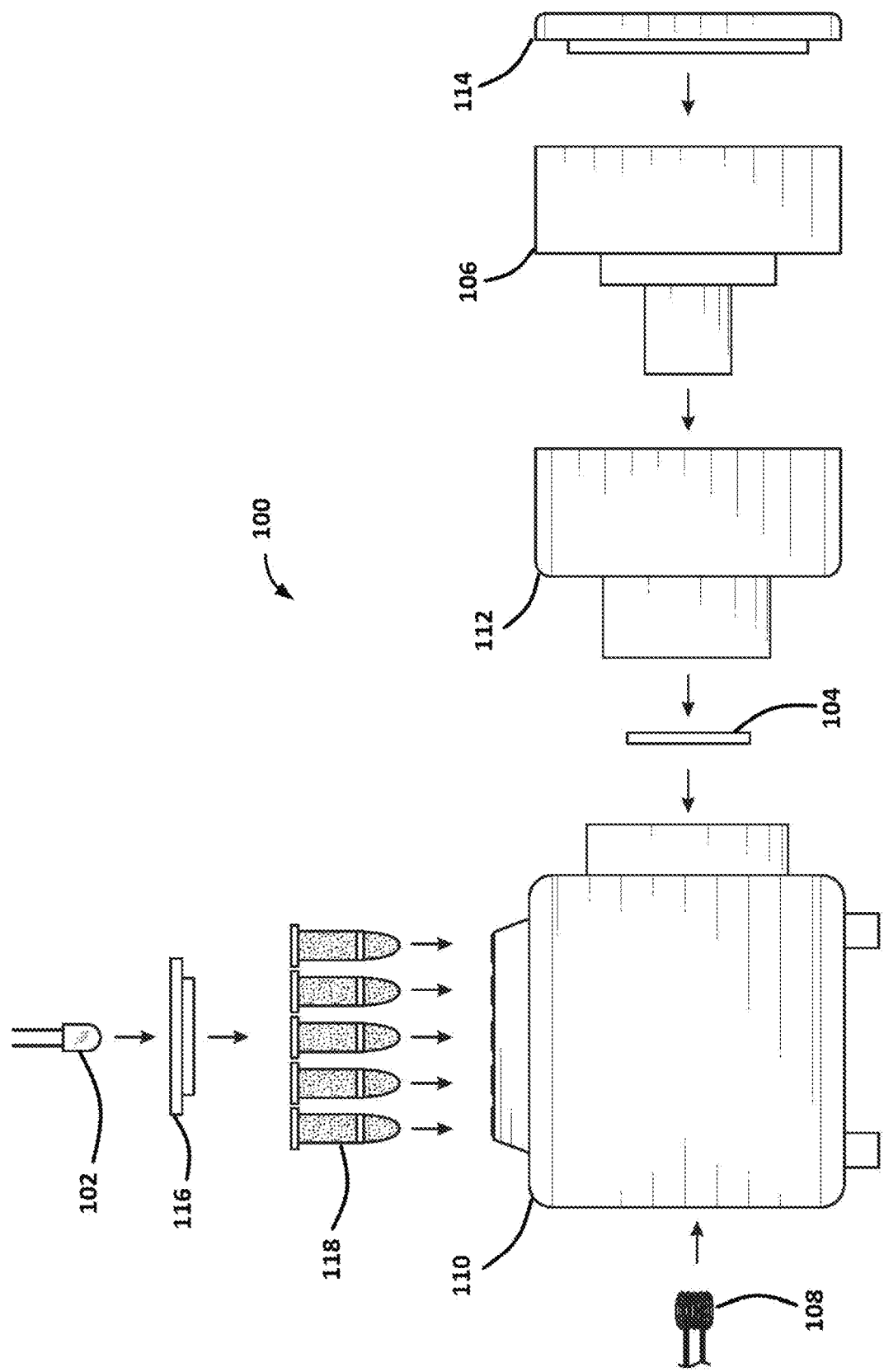
FIG. 2 shows an example embodiment of a sample reader 100 according to the present disclosure, wherein the sample reader 100 is configured to receive more than one sample container 118 such as a plurality of test tubes.

FIG. 2 shows another example embodiment of a sample reader 100 according to the present disclosure. The sample reader 100 comprises a light source 102, a filter 104, an imager 106, preferably a camera, a heating element 108, and housing comprising a reader housing unit 110, imager housing 112, an imager cover 114, and a reader lid 116. The sample reader 100 is configured to receive more than one sample container 118, such as test tubes.

Figure 3:
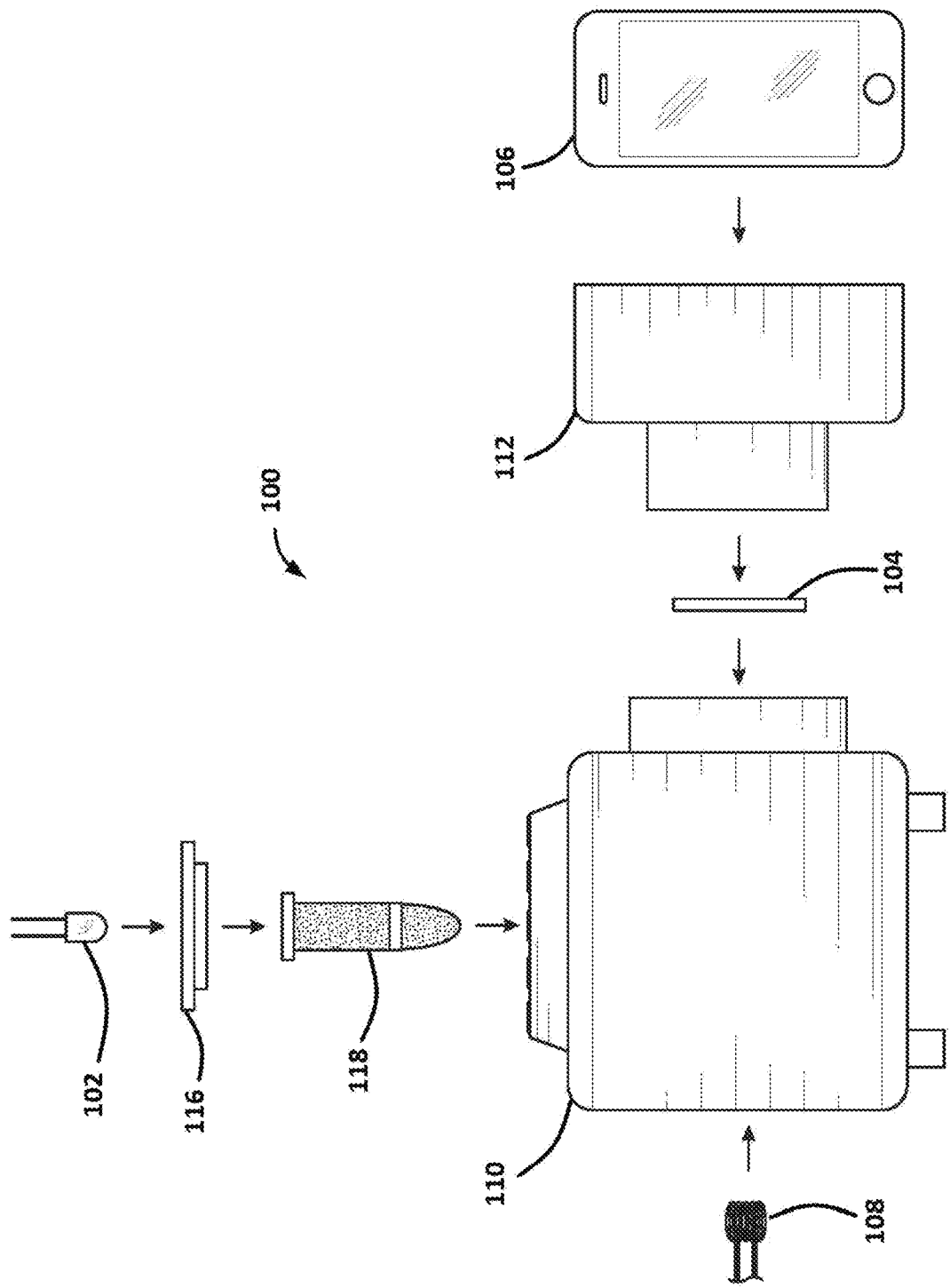
FIG. 3 depicts an example embodiment of a sample reader 100 according to the present disclosure, wherein the sample reader 100 uses a smartphone as an imager 106.

FIG. 3 shows a further example embodiment of a sample reader 100 according to the present disclosure. The sample reader 100 comprises a light source 102, a filter 104, a heating element 108, housing comprising a reader housing unit 110, imager housing 112, an imager cover 114, a reader lid 116, and an imager 106 comprising a smartphone. The sample reader of FIG. 3 may further comprise one or more fasteners (not shown) for temporarily fastening the smartphone imager 106 to the imager housing 112 or sample reader 100 as a whole. The sample reader 100 of FIG. 3 is configured to receive a sample container 118, such as a test tube.

Figure 4:
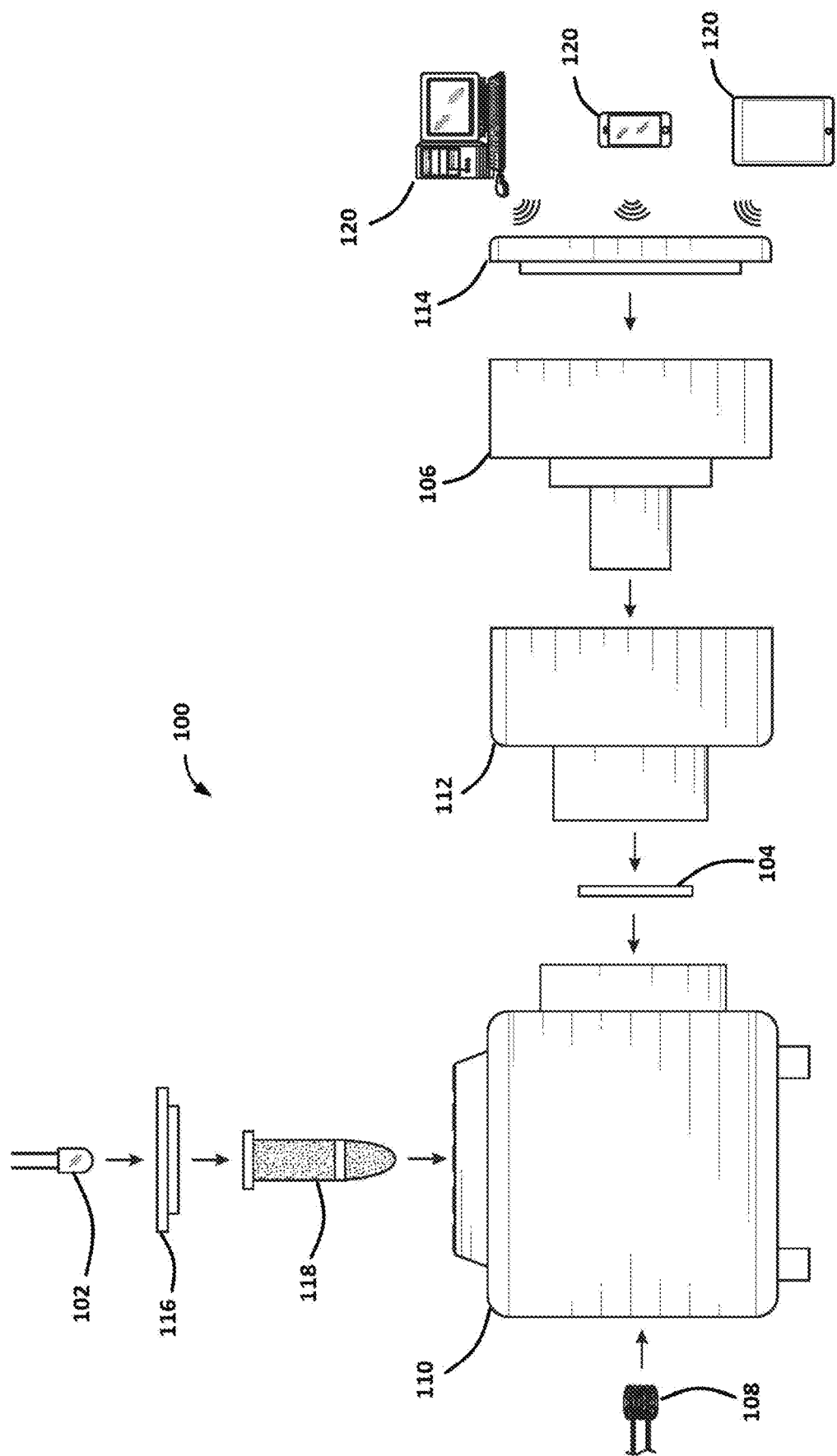
FIG. 4 depicts an example embodiment of a sample reader 100 according to the present disclosure, wherein the sample reader 100 is configured to receive more than one sample container 118 and wherein the sample reader 100 is configured to wirelessly connect to an external readout device 120 such as a computer, a smartphone, or a tablet.

FIG. 4 depicts an example embodiment of a sample reader 100 enabled to wirelessly connect and provide test readout information to an external readout device 120 such as a computer, a smartphone, or a tablet. The readout device 120 may be provided as part of the sample reader 100 or as a separate component. The sample reader 100 comprises a light source 102, a filter 104, an imager 106, preferably a camera, a heating element 108, and housing comprising a reader housing unit 110, imager housing 112, an imager cover 114, and a reader lid 116. The sample reader 100 is configured to receive more than one sample container 118, such as test tubes. In such an embodiment and in other embodiments described herein, the sample reader measures fluorescence intensity, and the intensity level is translated into a concentration of histones either by using a microcontroller or by sending the intensity to an external readout device (for example, a tablet, phone, computer) that translates the signal intensity into a histone concentration using calibration data. Alternatively, the external readout device or microcontroller compares the intensity to a pre-programmed/pre-determined threshold to determine if the histone levels are above or below a pre-determined threshold associated with a certain risk level, for example, a risk of multiple organ dysfunction.

Figure 5:
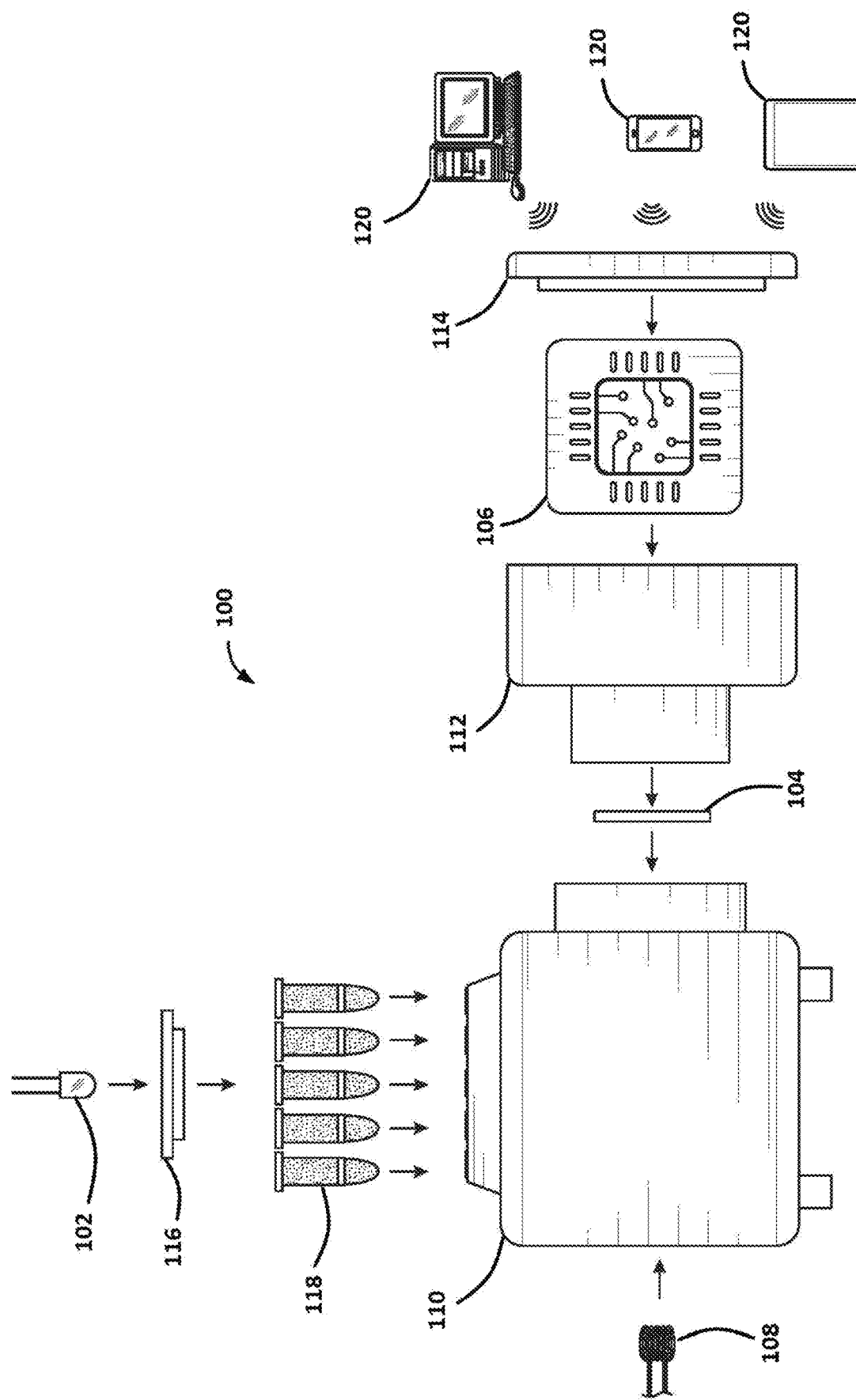
FIG. 5 shows an example embodiment of a sample reader 100 according to the present disclosure, wherein the sample reader 100 uses a photosensor chip/cartridge as an imager 106 and is configured to receive more than one sample container 118. The sample reader 100 is also configured to wirelessly connect to an external readout device 120 such as a computer, a smartphone, or a tablet.
Figure 6:
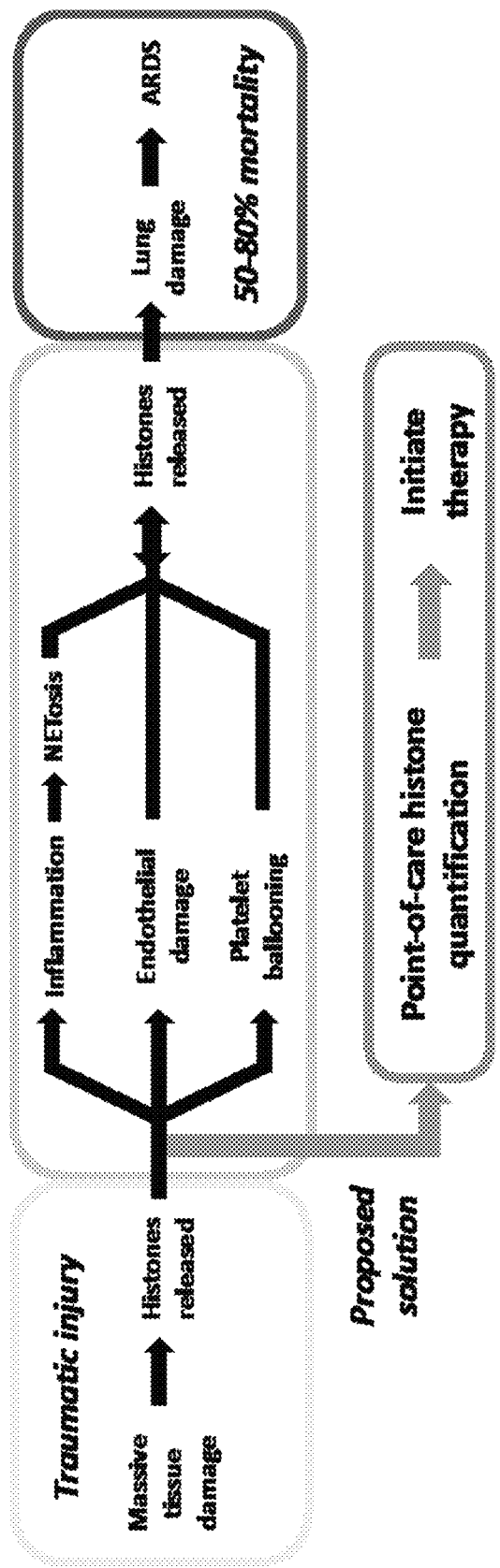
FIG. 6 depicts a pathway for clinical or field use of the assays and devices disclosed herein, namely following a traumatic injury incurring massive tissue damage, histones are released into the bloodstream. These circulating histones lead to inflammation, endothelial damage, and ultimately substantial lung damage and/or multiple organ failure. The presently disclosed assays and devices provide point-of-care quantification of circulating histones to predict the risk of ARDS and multiple organ failure following traumatic injury. Early detection and quantification of circulating histones enables a qualitative assessment of the risk of multiple organ failure and triggers therapeutic intervention before the failure of organs.

FIG. 5 depicts an example embodiment of a sample reader 100 enabled to wirelessly connect and provide test readout information to an external readout device 120 such as a computer, a smartphone, or a tablet. The readout device 120 may be provided as part of the sample reader 100 or as a separate component. The sample reader 100 comprises a light source 102, a filter 104, an imager 106, wherein the imager is a photosensor chip, a heating element 108, and housing comprising a reader housing unit 110, imager housing 112, an imager cover 114, and a reader lid 116. The sample reader 100 is configured to receive more than one sample container 118, such as test tubes.

An artisan of ordinary skill in the art need not view, within the isolated figure(s) described herein, the near-infinite number of distinct permutations of features described in the following detailed description to facilitate an understanding of the present disclosure.

Testing Kit

In an embodiment, the assays and portable sample reader may be provided as part of a kit for collecting and testing samples. The kit comprises, for example, one or more sample containers comprising the assay compositions described herein, a sample reader configured to receive the one or more sample containers, a sample collector such as a lancet, a blood collection capillary, a saliva collection cup, a vial, a collection cup, a swab, a nasopharyngeal swab, or a combination thereof, a power source, instructions for using the testing kit, a carrier for storage and transport of each of the components of the kit, or any combination thereof.

Methods of Use

The disclosure further relates to methods of using the assays and devices described herein. For example, methods of detecting an analyte are provided, wherein the method comprises (a) collecting a raw sample from an individual; (b) contacting the raw sample with a sample container comprising the assay compositions described herein; (c) exposing the sample container and the raw sample to heat thereby allowing the raw sample and the assay composition to form a mixture; (d) exposing the mixture to a stimulus, such as a light source; (e) detecting an output from the mixture, such as fluorescence; (f) quantifying the output; and (g) quantifying the analyte. In an embodiment, the quantity of the analyte is used to predict the risk of multiple organ failure;

In a further embodiment, the analyte comprises circulating histones and the concentration of circulating histones is clinically relevant to predicting the risk of multiple organ failure. Without being bound by theory, it is thought that in patients with trauma-induced lung injuries, those who developed multiple organ failure had a median histone level of 52.5 µg/mL, while those who did not develop multiple organ failure had a median histone level of 15.6 µg/mL. In comparison, healthy patients are believed to have a median histone level of 2.3 µg/mL. Thus, for the methods of detecting circulating histones, patients with a median histone level of about 45 µg/mL or greater can be considered high risk; patients with a median histone level of between about 10 µg/mL to about 44 µg/mL can be considered medium risk, and patients with a median histone level of less than 10 µg/mL can be considered low risk.

In some embodiments, the concentration of the analyte has a direct relationship with the generated output. In other embodiments, the concentration of the analyte has an indirect relationship with the generated output.

EXAMPLES

Example 1. Assay Preparation

Assay compositions were prepared by assembling various individual layers. First, an aggregation/fluorescence layer was prepared. The bottom layer of the assay was composed of blood aggregation components (e.g., dextran) and a fluorescent intercalator (e.g., EvaGreen). The aggregation/fluorescence buffer was made up of 7 g/dL dextran (150 kDa) (Sigma-Aldrich), 50 mM $CaCl_2$ (Sigma-Aldrich), and 12× EvaGreen (Biotium). 20 µL of this aggregation/fluorescence buffer was added to the bottom of a 600 µL microcentrifuge tube.

Next, a higher-order alkane layer was prepared. Eicosane wax (Alfa Aesar) was used as a partition to initially separate the reagent layers. To construct the partition, the eicosane was melted by placing the wax stored in a glass vial on a hot plate set to 120° C. for at least 10 minutes (it is transparent when liquid, and white when solid). 2 µL eicosane wax was pipetted atop the aggregation/fluorescence layer, and the tube was placed in a 42° C. water bath to ensure an even distribution of the alkane layer via annealing. During this anneal, the wax thinned in the center, while congregating near the tube wall. The tube was removed from the water bath after 1 minute of melting and brought to room temperature until the wax hardened (approximately 2 minutes). An additional 1 µL of eicosane wax was pipetted onto the thin center of the wax layer to ensure a complete seal between layers.

A DNA layer was then positioned above the higher-order alkane layer. The DNA layer was made up of 300 nM (147 bp) DNA (100 nM final concentration), generated via PCR on a region of the methicillin-resistant *Staphylococcus aureus* genome (ATCC). The DNA was suspended in 500 mM NaCl (Sigma-Aldrich) and 3.3 mM $MgCl_2$ (Sigma-Aldrich) to mimic internal cell conditions. 15 µL of the DNA layer was added above the eicosane.

Example 2. Histone Detection

Following the preparation of the assay composition, the assays were tested for their ability to convey histone concentration. First, histone dilutions were prepared. Varying concentrations of histone octamers (Sigma-Aldrich) (0 µg/mL-65 µg/mL) were suspended in either fetal bovine serum (FBS) (ATCC) or whole blood (AllCells) (medium is indicated in figure caption). 15 µL histone-spiked sample was added to the DNA layer of the assays of Example 1. The DNA wraps around any histones in the sample during a 10-minute incubation period at room temperature. Histone detection capability was then assessed using a portable device according to the disclosure and compared to benchtop reader measurements.

Consistent with FIGS. 1-5, the portable sample reader device comprised two substitutable sections: a sample holder section and an imager section. The sample holder section comprised a 3D printed housing unit designed to fit a 600 µL microcentrifuge tube. The 3D printed housing unit also included a support that holds a heating element—a coil of nichrome wire-near the bottom of the tube where the eicosane layer is located. A lid that holds a 470 nm blue LED light source was positioned on top of the housing unit, isolating the sample tube from outside light. The imager section comprised a 3D printed housing unit that fits an imager, specifically an ArduCAM MT9M001 Camera with an ArduCAM USB2 Camera Shield (ArduCAM) for interfacing with a computer. A 530 nm longpass filter (Thor Labs) was placed on the lens of the camera to block incoming light from the excitation LED light source and to allow emitted light from the fluorescence reaction through.

Following a 10-minute incubation period, the internal heating component of the portable sample reader melted the alkane layer by heating the sample tube to about 42° C. After 23 seconds of heating, the alkane barrier was opened, allowing the assay components above and below the initially solid alkane partition to mix.

Then, following a 20-minute incubation period, the camera was used to capture an image of the fluorescence emitted by the reaction in the sample tube. After an image of the tube was taken, it was automatically cropped to a 40×60-pixel box of the fluorescing area. The fluorescence reading was reported as the mean grayscale pixel value of the 40×60-pixel box. Speckling in the image due to small amounts of blood adhering to the plastic was removed by excluding pixels with values 15% below the mean and then recalculating the mean. The location of the box and the threshold value for speckle removal were determined by an optimization algorithm that found the lowest detection limit for an initial training dataset. These optimized parameters were then used for estimating histone concentration.

As a comparison to the portable sample reader, a water bath was used in place of the portable heater. Following the 10-minute incubation period of DNA with histone sample, sample tubes were placed in a 42° C. water bath for 1 minute, allowing the wax barrier to open and assay components to mix. For initial assay chemistry optimization, a Synergy LX plate reader from BioTek (500 nm excitation, 530 nm emission) was used to measure the fluorescence. After the alkane was melted, 15 µL of the assay liquid was moved to a 384-well plate. Fluorescence measurement was taken after 20 minutes.

Figure 10:
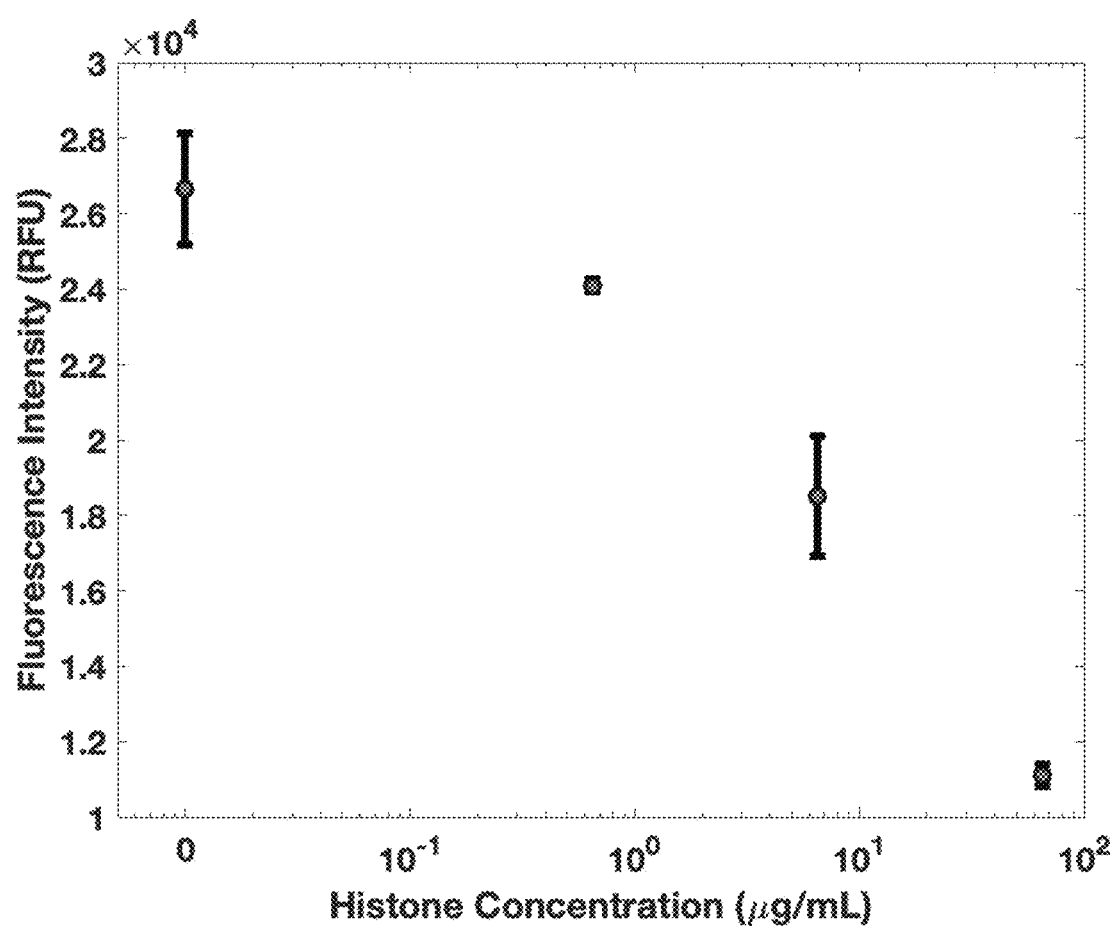
FIG. 10 is a graph showing the fluorescent quantification of histone octamers in FBS using a benchtop plate reader (N=3).

The fluorescence signal versus the histone concentration for the benchtop plate is shown in FIG. 10. Different DNA concentrations were analyzed to identify preferred ranges in fluorescence between high and low histone levels using the portable sample reader described herein. The results are shown in FIG. 11 and FIG. 12.

More particularly, FIG. 10 was generated using a plate reader, which is an effective fluorescence reader in a laboratory setting but incompatible with a point-of-care diagnostic for severe trauma. The benchtop fluorescence results demonstrate the expected degree of fluorescence intensity and proved the principle underlying the assays described herein: as histone concentration in the sample increases, the EvaGreen fluorescence decreases, indicating that the DNA is binding to the histone complexes, thus excluding the EvaGreen from intercalation.

Figure 11:
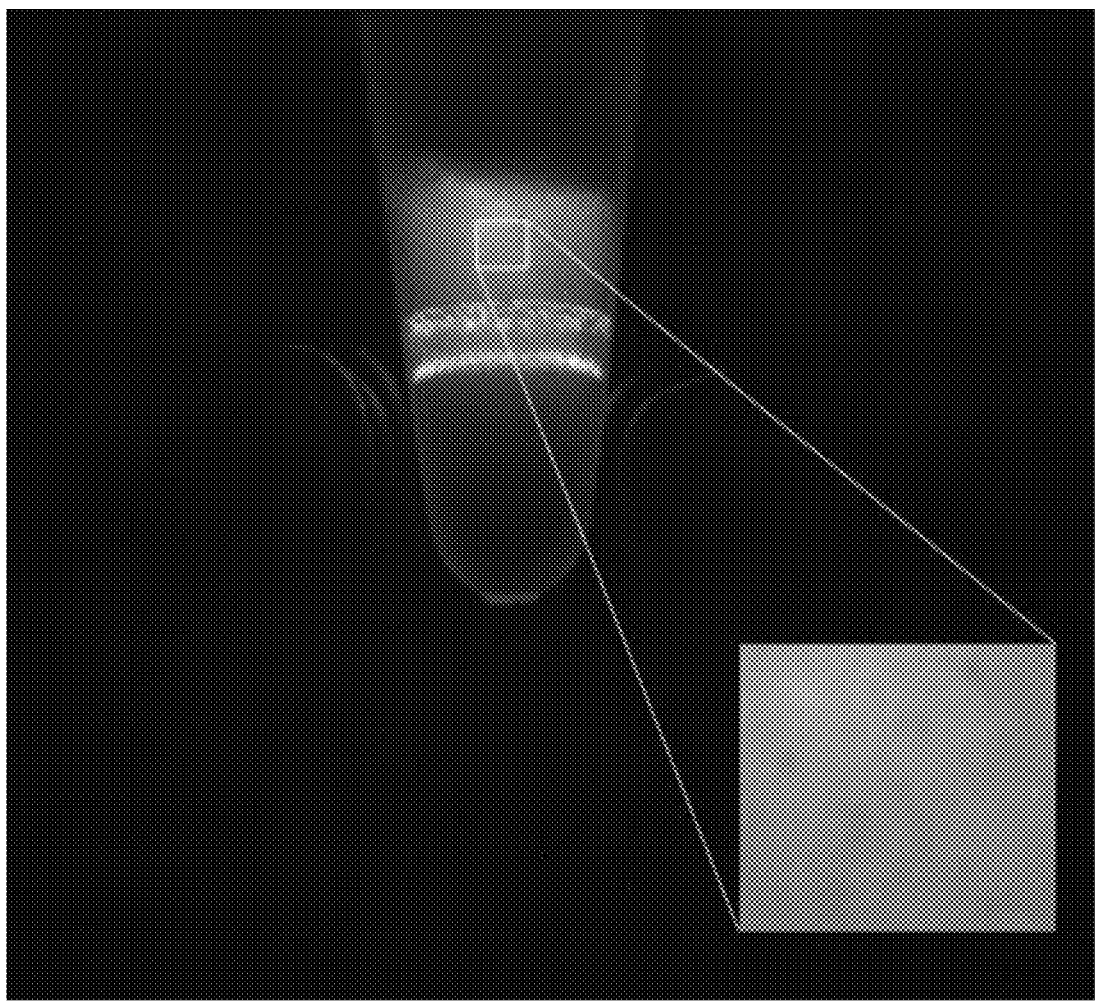
FIG. 11 is an image of the assay reaction that has taken place in the sample tube. The image was taken by the portable sample reader device described herein. An algorithm was used to select a box in the fluorescent region and quantify the grayscale intensity.
Figure 12:
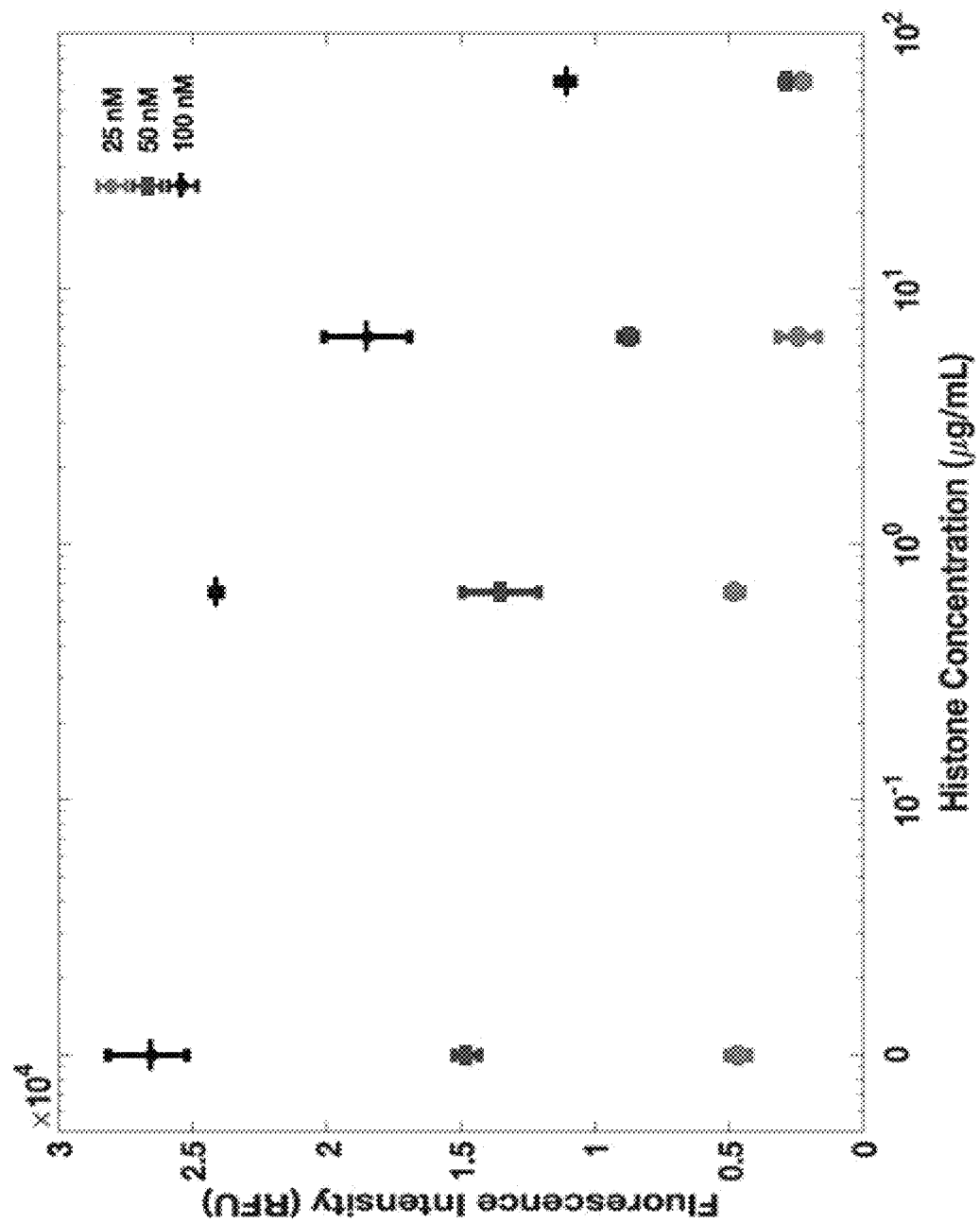
FIG. 12 is a graph showing the measured fluorescence intensity versus histone concentration for varying concentrations of double-stranded DNA in the reaction occurring using the assay compositions.

FIGS. 11 and 12 demonstrate the efficacy of the portable sample reader comprising a heater, an LED light source, a camera imager, and an optical filter. The sample tube slots into the portable device, enabling direct fluorescence measurements. The imager takes a photo of the reaction occurring in the sample tube. An algorithm selected a box in the fluorescent region of the sample tube and quantified the grayscale intensity.

Limit of detection was calculated as follows:

IUPAC LoD=$(3 \times \sigma_{blank})/A$

ISO LoD=$1.645(\sigma_{blank}/A)+1.645(\sigma_{lowest\ positive}/A)$

Wherein A is an abbreviation for analytical sensitivity which is the slope between the blank and lowest positive concentration. The standard deviations are calculated from the triplicates at the blank and the lowest positive data point. Accordingly:

$\sigma_{blank}$=0.6326

$\sigma_{lowest\ positive}$=4.0183

A=(145.3434−136.8975)/(0.5−0)=16.8917

Figure 13:
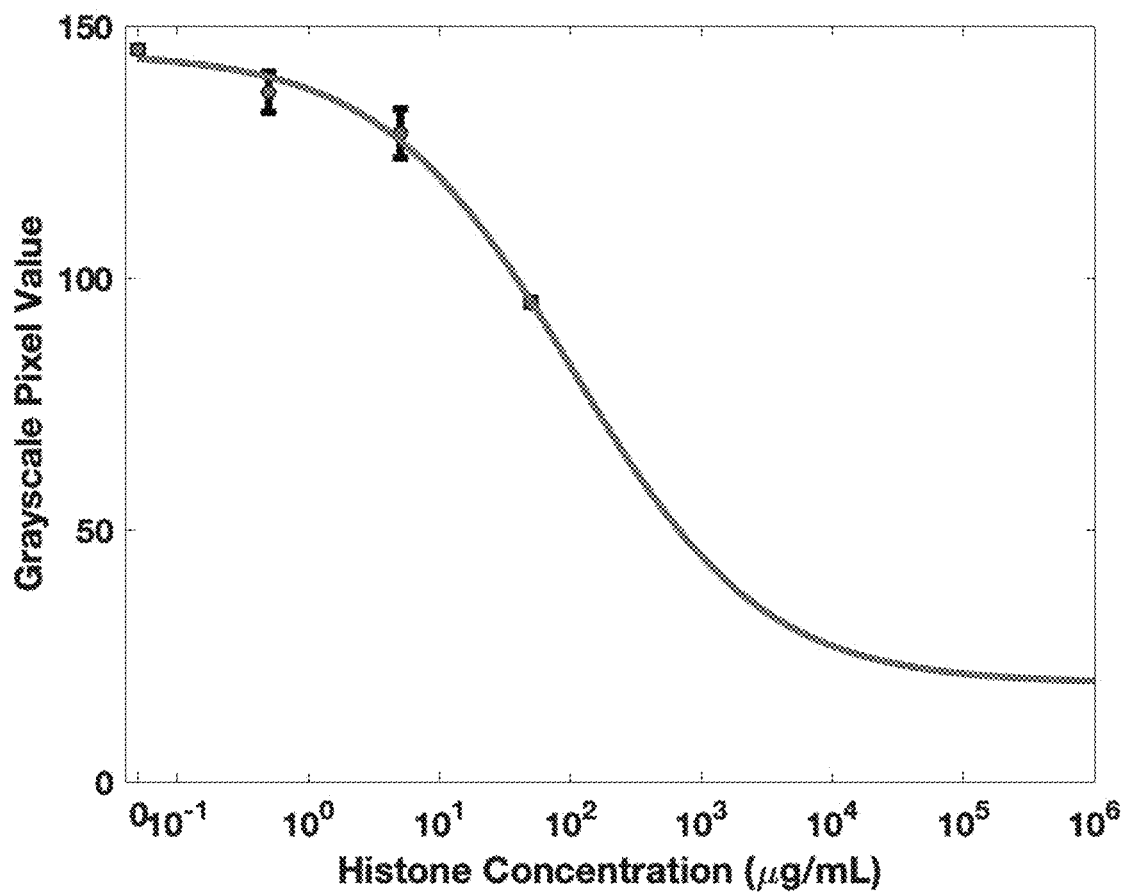
FIG. 13 shows a reverse sigmoidal curve fit. Using a reverse sigmoidal curve fit in MATLAB and assuming a grayscale pixel value of a non-fluorescent sample as histone concentration approaches infinity, the curve was modeled for histone levels above what was tested experimentally. The extrapolated upper limit of detection was determined to be about 0.1 g/mL histone octamers in blood, several magnitudes above clinically relevant values.

Using a reverse sigmoidal curve fit in MATLAB and assuming a grayscale pixel value of a non-fluorescent sample as histone concentration approaches infinity, the curve was modeled for histone levels above what was tested experimentally. As shown in FIG. 13, the extrapolated upper limit of detection for the portable sample reader was determined to be about 0.1 g/mL (or 100 ng/mL) histone octamers in blood, several magnitudes above clinically relevant values.

Figure 14A:
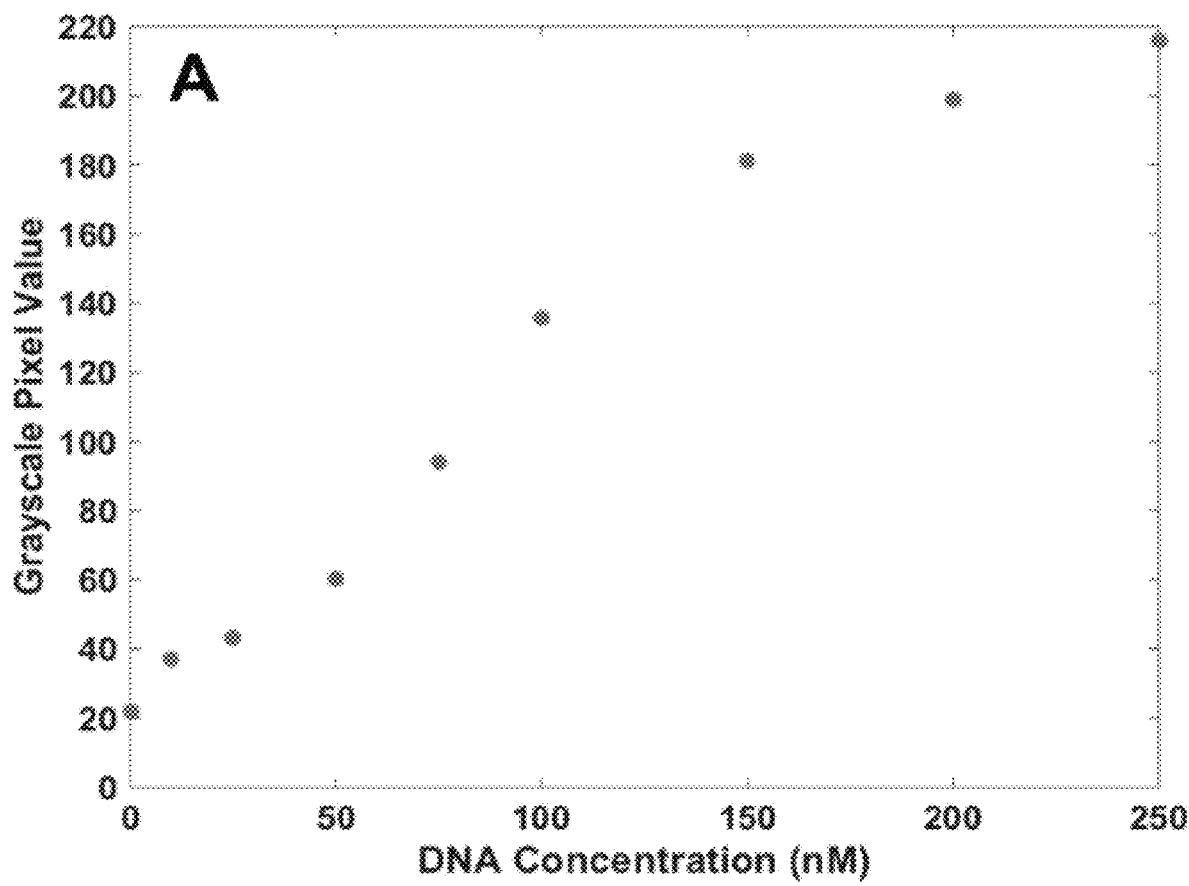
FIG. 14A shows fluorescent measurements produced from the portable fluorescence reader described herein.
Figure 14B:
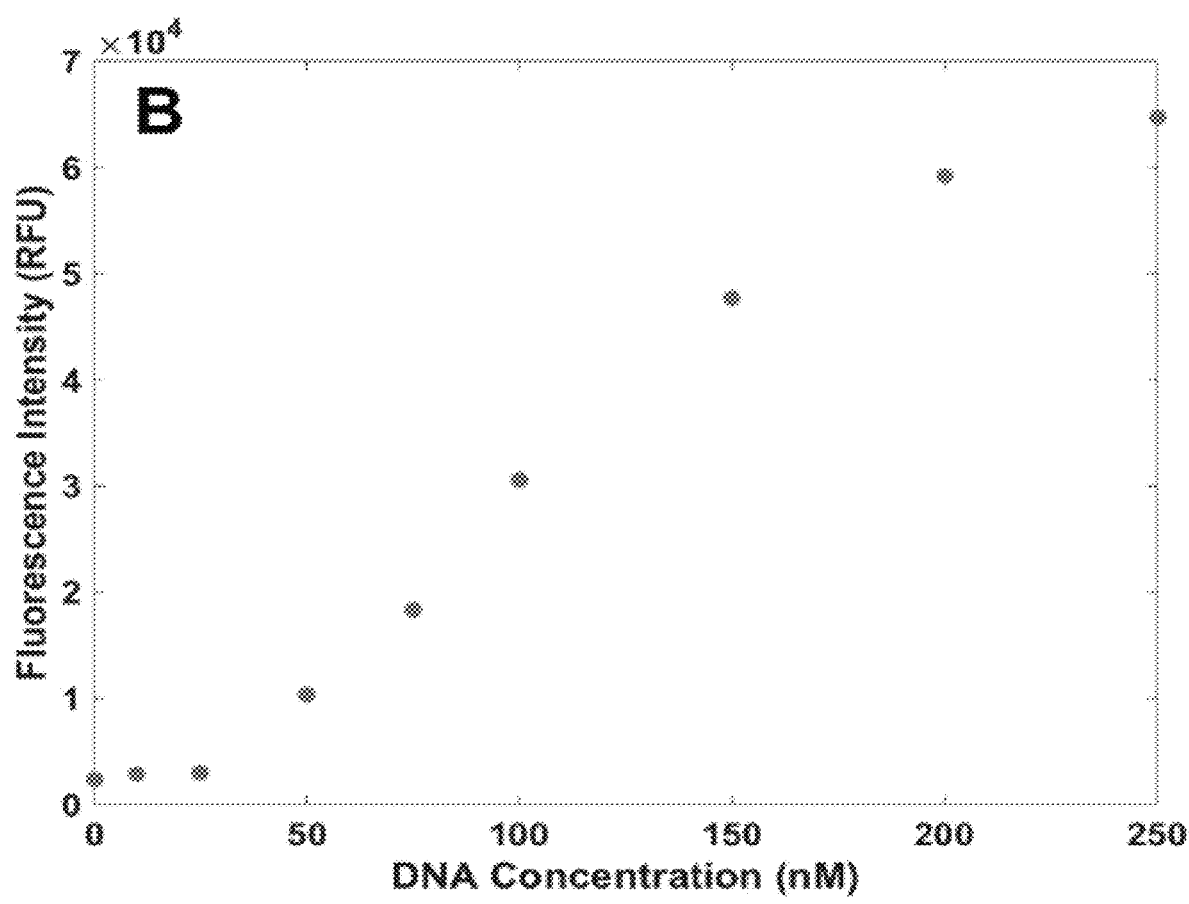
FIG. 14B shows the fluorescent measurements produced from a benchtop plate reader.
Figure 14C:
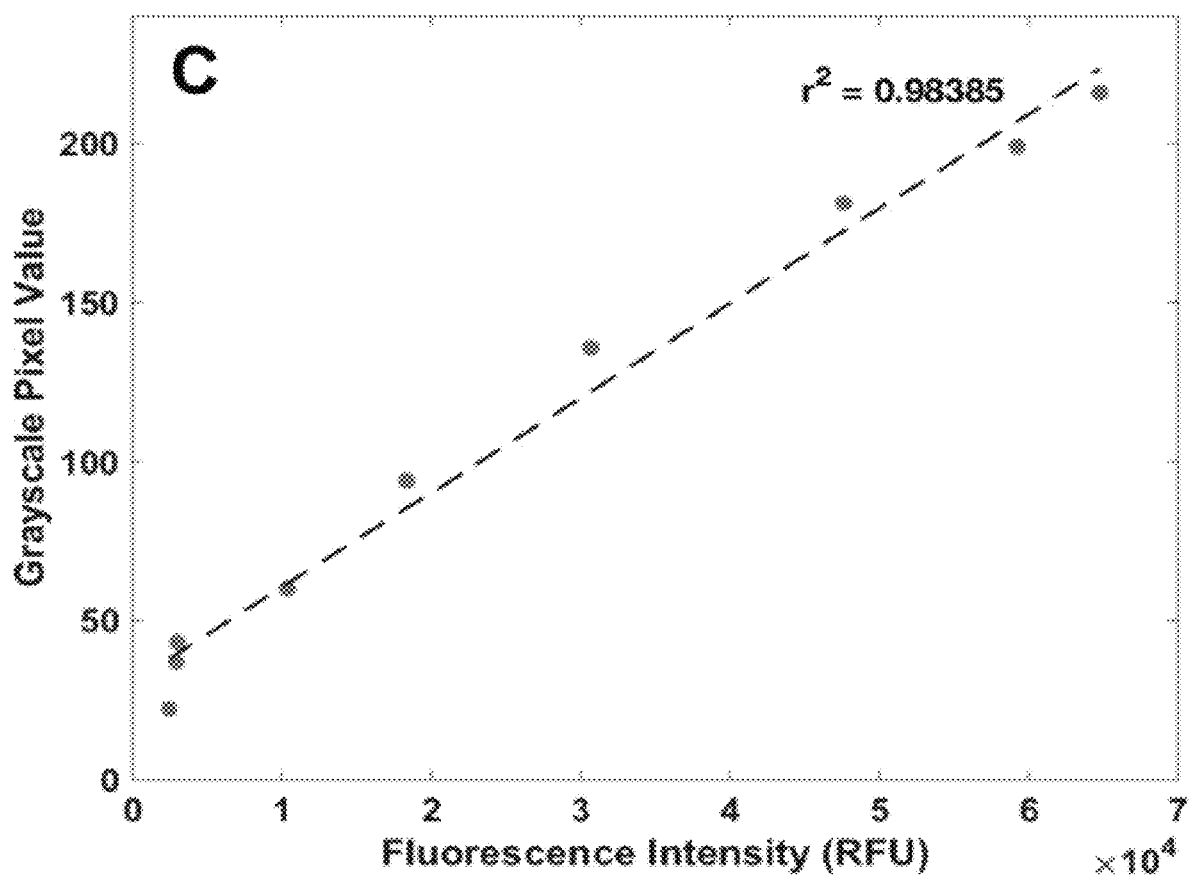
FIG. 14C provides a comparison of the resulting measurements from the portable fluorescence reader in FIG. 13A and the benchtop plate reader in FIG. 13B.

A more detailed comparison of the performance of the portable reader against the benchtop plate reader is shown in FIG. 14A, FIG. 14B, and FIG. 14C. In these figures, varying 147 bp DNA was added with 1× EvaGreen and the resulting fluorescence was measured in both devices. FIG. 14A shows the fluorescent measurements produced from the portable fluorescence reader. FIG. 14B shows the fluorescent measurements produced from the benchtop plate reader. FIG. 14C provides a comparison of resulting measurements from the portable fluorescence reader and benchtop plate reader. Overall, the figures show that the portable fluorescence sample reader has slightly improved detection limits over the gold standard comparison for histone octamers. The portable device may be used to detect individual histone proteins as well as the dimers and tetramers that make up a histone octamer. However, in a preferred embodiment, the portable sample reader is used to detect whole histone octamers.

Example 3. Assessment of Incubation Period

The histone assay in FBS was repeated using the portable reader of Example 2. As in Example 2, fluorescence measurements were taken 20 minutes after melting the alkane layer to combine the assay components. The measured fluorescence intensity versus histone concentration is displayed in FIG. 15. This figure further illustrates the imaging performance of the portable sample reader. It is noted that transferring the assay from tube to well for plate reader measurements would likely be effective, although the incubation time may vary.

In Example 2 and Example 3, the fluorescence was recorded after an incubation period following the time at which the reagents were combined (i.e., after the alkane partition was liquified and removed). This incubation time is important to allow the dye, e.g., EvaGreen to diffuse and intercalate with the free DNA in the solution. At the same time, however, it is important to minimize the time required for the assay to enable the system to be amenable to the point-of-care paradigm.

Figure 16:
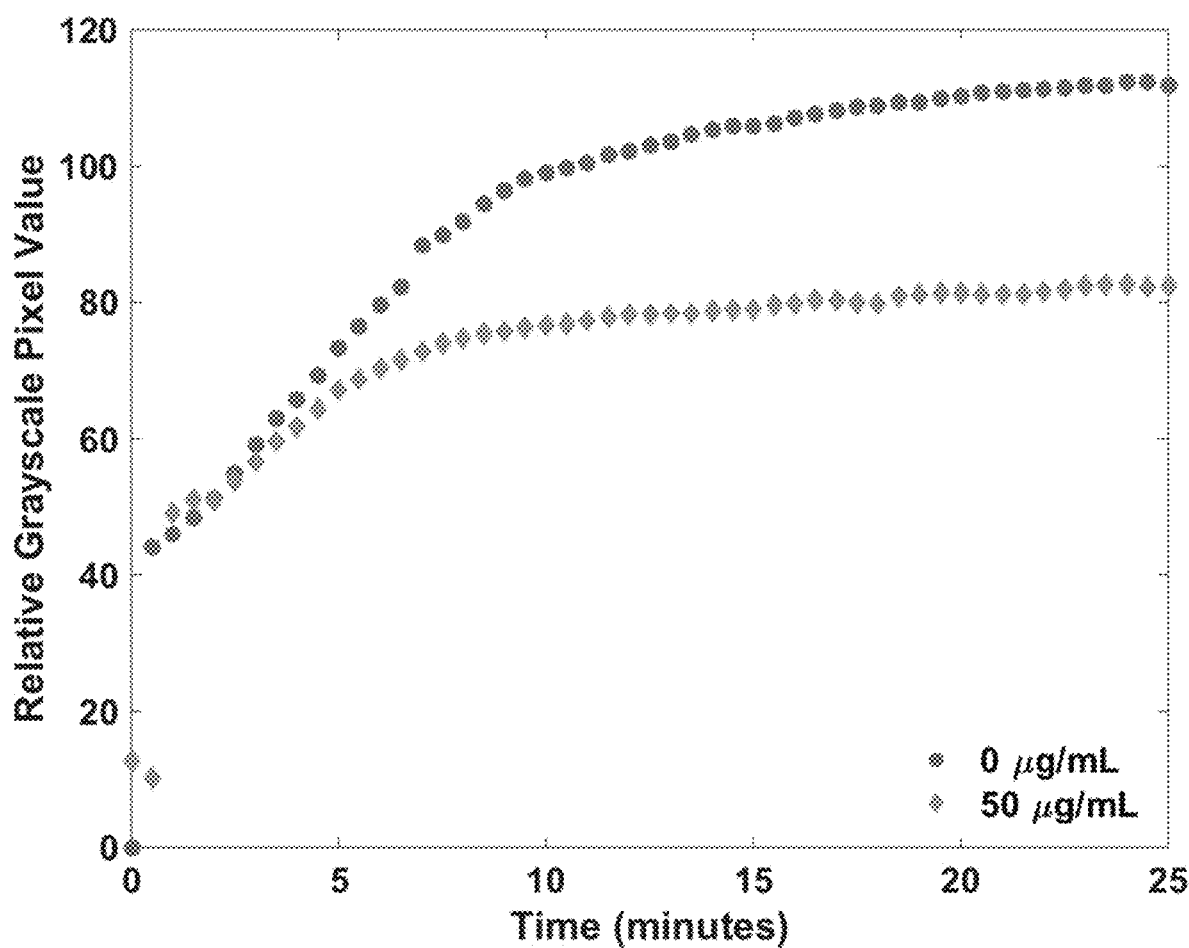
FIG. 16 is a graph showing the fluorescent quantification of histone octamers in FBS using the portable fluorescence reader over 25 minutes. The heater was turned on at t=0 seconds to melt the hydrocarbon sacrificial partition and was turned off at t=23 seconds.

FIG. 16 shows the time-dependent fluorescence measurements taken by the portable device. Data points were recorded every 30 seconds for 25 minutes beginning when the heater was turned on. Approximately 20 minutes was the preferred incubation time before recording the fluorescence. Because the fluorescence begins to saturate before 20 minutes, it may be possible to get an earlier readout to distinguish toxic histone concentrations from healthy histone concentrations. However, measuring fluorescence before 20 minutes may result in a higher detection limit and the user may not be able to distinguish slightly elevated histone levels from healthy histone levels.

Example 4. Red Blood Cell Aggregation

Commercially available whole blood treated with an anticoagulant (sodium citrate) was used as part of demonstrating red blood cell aggregation provided by the assay compositions. All blood experiments were performed between 24 and 48 hours after the blood was collected. The blood was shipped at 4° C. and was stored at 4° C. until used. To demonstrate the blood separation speed under varying buffer conditions, 15 µL sodium citrate-treated whole blood with 2 µM FAM fluorophore (IDT) is added to a microcentrifuge tube containing 7 g/dL dextran (150 kDa) and 50 mM $CaCl_2$ for a total of 50 µL. The sample tube was heated to 42° C. for 23 seconds to mimic assay conditions. Fluorescence measurements were taken every 30 seconds for 15 minutes, beginning when the blood was added to the aggregates. This protocol was repeated with just dextran, just $CaCl_2$, and neither.

Figure 15:
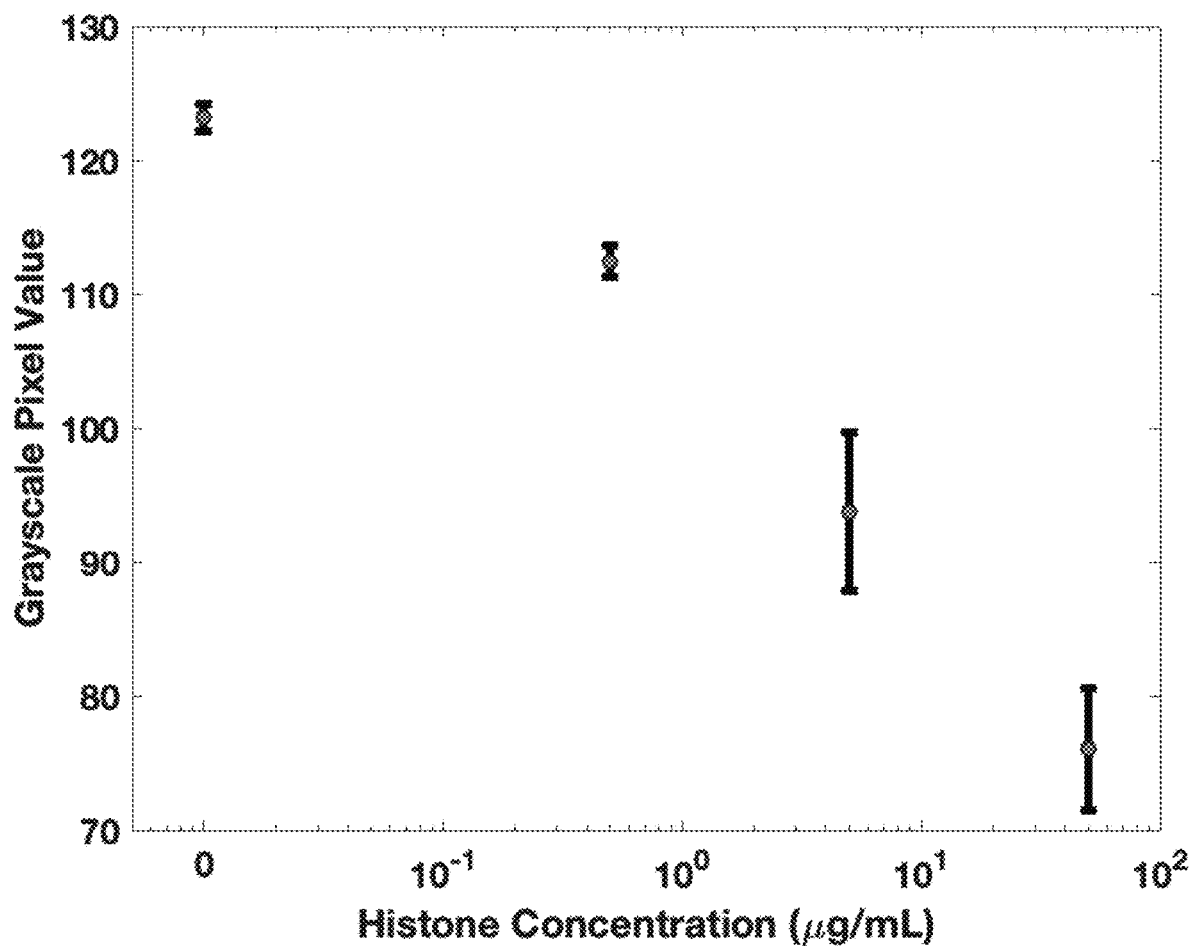
FIG. 15 is a graph showing the fluorescent quantification of histone octamers in FBS using the portable fluorescence sample reader disclosed herein (N=3).
Figure 17:
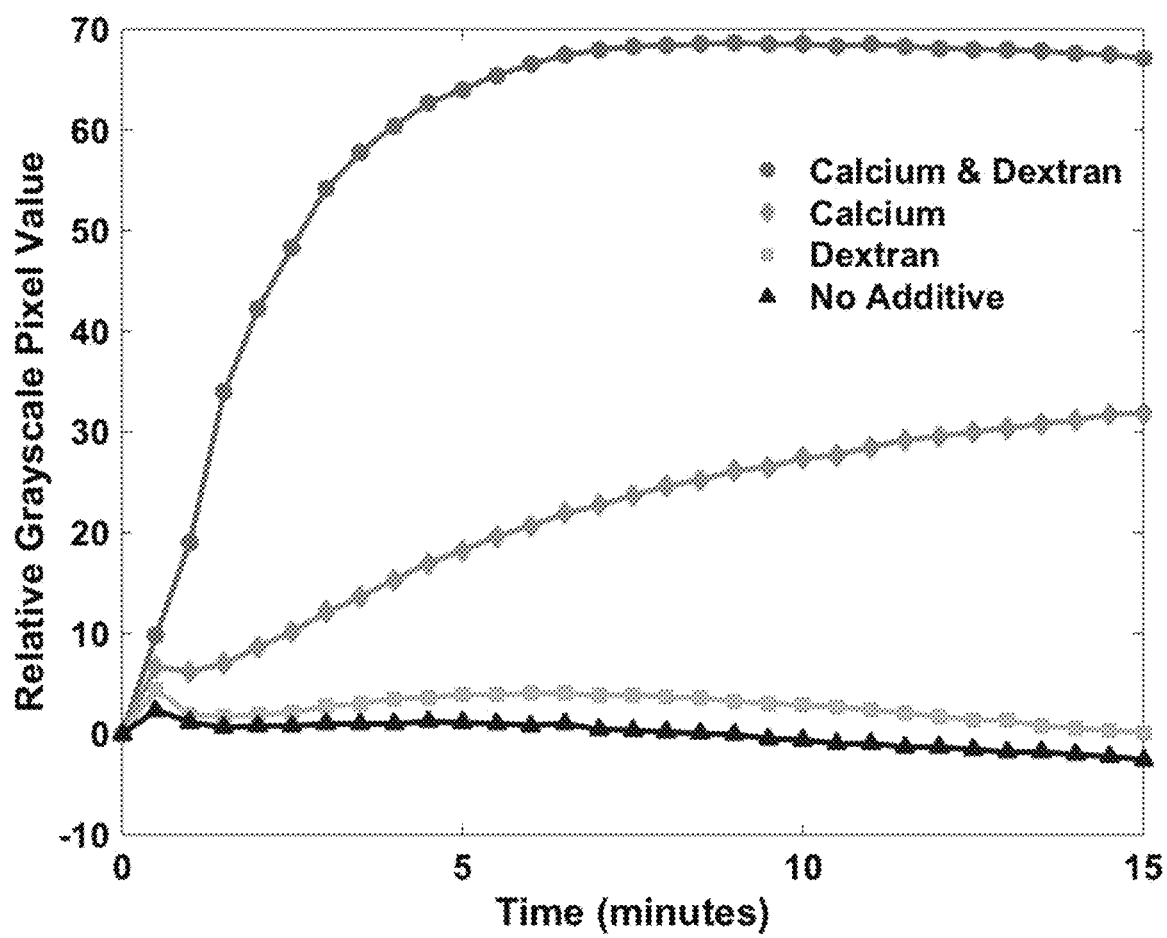
FIG. 17 is a graph depicting fluorescent measurements taken following the addition of calcium or dextran to a whole blood sample. Measurements were made every 30 seconds beginning as the additive(s) were added to the whole blood.

Due to the optical absorbance of red blood cells, fluorescence measurements cannot be made without initial blood separation. To avoid requiring a centrifuge for sample separation, polymers such as dextran were used to induce aggregation. Dextran was used along with calcium ions to reverse the effects of anticoagulants in the blood samples. FIG. 15 shows the fluorescence signal for a sample with DNA and EvaGreen over time after the addition of dextran and calcium begins to aggregate and separate the blood immediately and that signal equilibrates in less than 10 minutes. In FIG. 17, when just calcium ions are added (diamonds), the blood is behaving as if it were untreated with an anticoagulant. Thus, aggregation due to dextran is evident from the improvement of the blood treated with both calcium and dextran (circles) from the blood treated with just calcium (diamonds). The first fluorescence measurement was taken as the additives were added to the blood and the heater was turned on. After 23 seconds the heater was automatically switched off. This protocol was repeated without the addition of heat without any significant differences, indicating that the addition of heat in the final assay does not strongly affect blood separation.

Example 5. Rapid Quantification of Histones

Figure 18:
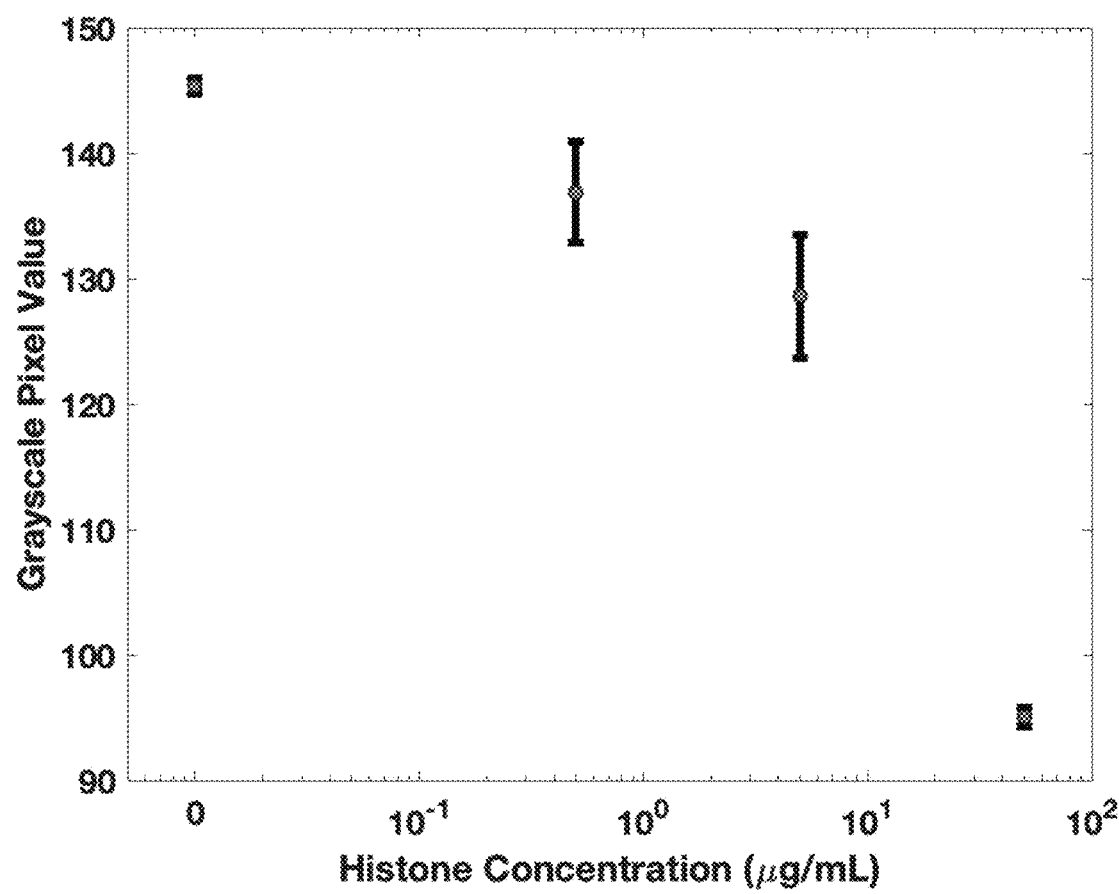
FIG. 18 is a graph showing the fluorescence quantification of histone octamers in whole blood using the portable fluorescence sample reader (N=3). The detection limit was determined to be 112 ng/mL using the IUPAC definition.

The rapid quantification of histones in whole blood was demonstrated using the portable sample reader and assay compositions disclosed herein. The assay composition of Example 1 was used in sample tubes. Fluorescence measurements were taken 20 minutes after melting the wax layer of the assay, allowing for the blood to automatically separate and for the EvaGreen dye to intercalate with any free DNA. Using the IUPAC definition of detection limit (3× standard deviation of the blank/analytical sensitivity), the limit of the detection was calculated to be 112 ng/mL and using the ISO/CLSI definition of the detection limit ((1.645/analytical sensitivity)×(standard deviation of the blank+standard deviation of the lowest positive sample)), the limit of detection was calculated to be 453 ng/mL. These detection limits are below the reported median for circulating histones in healthy patients, demonstrating clinical significance. The histone concentration as a function of the grayscale pixel value is shown in FIG. 18.

The assay was confirmed to be sample-to-answer because all steps (e.g., the addition of reagents to promote blood separation steps, as well as the reagents for histone detection) were integrated into the overall assay without additional manual steps or equipment required by the user. This suggests this point-of-care assay and portable sample reader disclosed herein could be used in near-patient settings to quickly diagnose the likelihood of multiple organ failure due to circulating histones caused by traumatic injury.

Additionally, as opposed to other existing histone detection assays, the sample reader described herein has integrated rapid and automatic blood separation to avoid requiring manual steps for the user or instrumentation, such as a centrifuge. Many devices claiming to be point-of-care friendly do not address sample preparation steps, thus rendering the systems incompatible with field use. By incorporating an automated blood separation step into the assay compositions of the disclosure, the diagnostic systems are truly sample-to-answer devices.

The embodiments being thus described, it will be obvious that the same may be varied in many ways. Such variations are not to be regarded as a departure from the spirit and scope of the disclosure and all such modifications are intended to be included within the scope of the following claims.

What is claimed is:
1. An assay composition comprising:
a red blood cell aggregator;
a hydrocarbon;
a target molecule comprising nucleic acids; and
a detectable label;
wherein the hydrocarbon is configured to form a solid sacrificial layer between one or more of the red blood cell aggregator, the target molecule, and the detectable label.

2. The assay composition of claim 1, wherein the red blood cell aggregator comprises a polysaccharide, a protein, a high molecular weight polymer, or a combination thereof.

3. The assay composition of claim 2, wherein the high molecular weight polymer has a molecular weight of between about 40,000 Da to about 500,000 Da.

4. The assay composition of claim 1, wherein the hydrocarbon comprises hexadecane, octadecane, eicosane, docosane, tetracosane, octacosane, paraffin, lauric acid, palmitic acid, capric acid, propionic acid, caproic acid, caprylic acid, myristic acid, stearic acid, butyric acid, valeric acid, or a combination thereof.

5. The assay composition of claim 1, wherein the target molecule comprises a 147 bp double-stranded DNA fragment from a nucleosome.

6. The assay composition of claim 1, wherein the detectable label is a dye.

7. The assay composition of claim 6, wherein the dye comprises SYBR green, SYBR blue, SYBR gold, SYBR Safe, Crystal violet, theophylline, caffeine, acriflavine, proflavine, acridine orange, acridine yellow, quinacrine mustard, adriamycin, daunomycin, thiazole orange, thiazole-coumarin, 9-aminoacridine (9-AA), N2-methyl-9-hydroxyellipticine (NMHE), N2,N6-dimethyl-9-hydroxy-ellipticine (DMHE), Hoechst 34580, Hoechst 33342, Hoechst 33258, 4',6-diamidino-2-phenylindole (DAPI), distamycin, chromomycin, phenanthridine, ethidium bromide, propidium iodide, hexidium iodide, dihydroethidium, ethidium homodimer, ethidium monoazide, propidium monoazide, 9-Amino-6-chloro-2-methoxyacridine (ACMA), 7-AAD, LDS 751, hydroxystilbamidine, SYTO-9, SYTO-13, SYTO-16, SYTO-60, SYTO-62, SYTO-82, SYTOX Blue, SYTOX Green, SYTOX Orange, POPO-3, YOYO-1, TOTO-1, TOTO-3, BEBO, LOLO, JOJO, BOBO-3, PO-PRO-3, BO-PRO, TO-PRO-3, JO-PRO, LO-PRO, YO-PRO-1, DiYo, DiTO, SYTO, OPA, NDA, JOE, FAM, Gel Red, fluorescamine, fluorescein, fluorescein isothiocyanate, tetramethyl rhodamine isothiocyanate, rhodamine, tetramethyl rhodamine, pyrene, PicoGreen, dansyl chloride, a compound according to the following formula:

wherein [X] is a substantially aliphatic, substituted, or unsubstituted linker comprising from about 8 to about 150 non-hydrogen atoms; $Q_1$ and $Q_2$ are each a dye constituent selected from a fluorescent nucleic acid dye constituent, a fluorescent non-nucleic acid dye constituent; and/or wherein or when either $Q_1$ or $Q_2$ is a fluorescent nucleic acid dye constituent, at least one of $Q_1$ and $Q_2$ has a structure according to the formula:

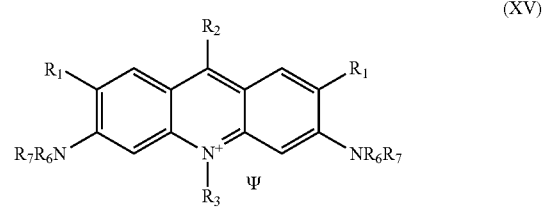

wherein each $R_1$ is independently H or a $C_1$-$C_2$ alkyl; one of $R_2$ and $R_3$ represents where [X] attaches to the structure such that when $R_2$ represents where [X] attaches to the structure, $R_3$ is H or —$CH_3$; when $R_3$ represents where [X] attaches to the structure, $R_2$ is selected from H, —$CH_3$, —$NH_2$, —$NHCH_3$, —CN, and —C(=O)$NH_2$; wherein each $R_6$ is independently H or a $C_1$-$C_2$ alkyl; each $R_7$ is independently H or a $C_1$-$C_2$ alkyl; wherein for each pair of adjacent $R_6$ or $R_7$ and $R_1$, independently, $R_6$ or $R_7$ and $R_1$ may in combination form a 5- or 6-membered, saturated or unsaturated ring; and wherein $\Psi$ is an anion; or a combination thereof.

8. A kit comprising:

one or more sample containers comprising the assay composition of claim 1;

a sample reader; and a sample collector comprising a lancet, a blood collection capillary, a collection cup, a vial, a swab, or a combination thereof, and one or more of a power source, an instruction manual for using the kit, and a carrier for storage and transport of the kit.

9. A method of making an assay composition comprising:

(a) adding a red blood cell aggregator and a detectable label to a sample container;

(b) adding a liquid hydrocarbon to the sample container and solidifying the liquid hydrocarbon to form a solid sacrificial layer;

(c) adding a target molecule to the sample container on top of the solid sacrificial layer;

and wherein in the presence of heat, the solid sacrificial layer becomes a liquid hydrocarbon thereby allowing the assay composition to mix.

10. The method of claim 9, wherein the red blood cell aggregator comprises a polysaccharide, a protein, a high molecular weight polymer, or a combination thereof; wherein the liquid hydrocarbon comprises hexadecane, octadecane, eicosane, docosane, tetracosane, octacosane, paraffin, lauric acid, palmitic acid, capric acid, propionic acid, caproic acid, caprylic acid, myristic acid, stearic acid, butyric acid, valeric acid, or a combination thereof; wherein the target molecule comprises a 147 bp double-stranded DNA fragment from a nucleosome; and wherein the detectable label comprises SYBR green, SYBR blue, DAPI, propidium iodine, SYBR Gold, SYBR Safe, EvaGreen, Crystal violet, ethidium bromide, fluorescein, dansyl chloride, or a combination thereof.

11. The method of claim 7, wherein the sample container comprises a capillary, chamber, reservoir, cuvette, microfuge tube, test tube, a planar container, a microfluidic channel, conical centrifuge tube, or a combination thereof.

* * * * *